United States Patent [19]
Takahashi et al.

[11] Patent Number: 4,709,149
[45] Date of Patent: * Nov. 24, 1987

[54] COPYING MACHINE

[75] Inventors: Haruhiko Takahashi; Toshiharu Inui; Hiroyuki Saitoh; Noriyoshi Ishikawa; Hitoshi Funato; Takashi Ohmori; Masami Kurata; Yasuo Katou, all of Kanagawa, Japan

[73] Assignee: Fuji Xerox Co., Ltd., Tokyo, Japan

[*] Notice: The portion of the term of this patent subsequent to Apr. 28, 2004 has been disclaimed.

[21] Appl. No.: 762,866

[22] Filed: Aug. 6, 1985

[30] Foreign Application Priority Data

Aug. 7, 1984 [JP] Japan ................. 59-164324

[51] Int. Cl.$^4$ .............................................. G03C 5/16
[52] U.S. Cl. ................................ 250/317.1; 250/318; 250/319; 219/216; 346/76 PH; 346/160; 400/120; 355/14 C; 355/14 CU
[58] Field of Search ..................... 250/317.1, 318, 319; 219/216 PH; 346/76 PH, 160; 400/120; 355/14 CU, 14 C

[56] References Cited

U.S. PATENT DOCUMENTS

| 4,442,460 | 4/1984 | Kurata et al. | 346/76 PH |
| 4,447,832 | 5/1984 | Kurata et al. | 346/76 PH |
| 4,449,152 | 5/1984 | Kurata et al. | 346/76 PH |
| 4,469,433 | 9/1984 | Kurata et al. | 346/76 PH |
| 4,536,774 | 8/1985 | Inui et al. | 346/76 PH |
| 4,574,293 | 3/1986 | Inui et al. | 400/120 |
| 4,583,127 | 4/1986 | Kurata et al. | 346/76 PH |

Primary Examiner—Craig E. Church
Assistant Examiner—John C. Freeman
Attorney, Agent, or Firm—Finnegan, Henderson, Farabow, Garrett, and Dunner

[57] ABSTRACT

A copying machine records an image on a recording sheet through the use of an ink donor sheet with thermally transferable ink. The copying machine includes a platen of glass for supporting an original to be copied, a scanner unit movable reciprocally relative to the platen for reading a series of lines on the original and for generating an image signal for each line, a thermal head having a heating region for selectively generating thermal pulses in response to the image signal from the scanner unit, an ink donor sheet supply assembly for supplying the thermal head with an ink donor sheet coated with thermally transferable ink which can be fluidized or sublimable upon being heated, a recording sheet supply assembly for supplying a recording sheet in the vicinity of the thermal head, a contacting assembly for bringing the supplied recording sheet into intimate contact with a heating region of the thermal head with the ink donor sheet interposed between the thermal head and the recording sheet, and a recording sheet discharging assembly for discharging the recording sheet peeled off the ink donor sheet after the image has been recorded on the recording sheet.

6 Claims, 49 Drawing Figures

| NO. | 1 | 2 | 3 | 4 | 5 | 6 | 7 | ----- | 129 | 130 | 131 | --- | 257 | 258 | --- | 384 |
|---|---|---|---|---|---|---|---|---|---|---|---|---|---|---|---|---|
| DATA | 0 | 1 | 1 | 1 | 0 | 1 | 0 | ----- | 1 | 1 | 1 | --- | 0 | 1 | --- | 0 |

| NO. | 385 | 386 | --- | 512 | 513 | 514 | ----- | 640 | 641 | 642 | --- | 769 | 770 | 771 | --- | 863 | 864 |
|---|---|---|---|---|---|---|---|---|---|---|---|---|---|---|---|---|---|
| DATA | 1 | 0 | --- | 1 | 0 | 1 | ----- | 0 | 0 | 0 | --- | 1 | 1 | 0 | --- | 1 | 0 |

⎫
⎬ 24
⎭

| 0th GROUP | NO. | 1 | 2 | 3 | 4 | 5 | 6 | 7 | ——————— | 128 |
|---|---|---|---|---|---|---|---|---|---|---|
| | DATA | 0 | 1 | 1 | 1 | 0 | 1 | 0 | ——————— | 1 |

| 1st GROUP | NO. | 129 | 130 | 131 | ——————— | 256 |
|---|---|---|---|---|---|---|
| | DATA | 1 | 1 | 1 | ——————— | 0 |

| 2nd GROUP | NO. | 257 | 258 | ——————— | 384 |
|---|---|---|---|---|---|
| | DATA | 0 | 1 | ——————— | 0 |

| 6th GROUP | NO. | 769 | 778 | 771 | ——————— | 863 | 864 |
|---|---|---|---|---|---|---|---|
| | DATA | 1 | 1 | 0 | ——————— | 1 | 0 |

COPYING MACHINE

RELATED APPLICATIONS

This application is related to Ser. No. 763,792 filed Aug. 8, 1985 entitled "Two-Color Copying Machine" which is incorporated herein by reference.

BACKGROUND OF THE INVENTION

1. Field of the Invention

The present invention relates to a copying machine, and more particularly, to a copying machine employing an ink donor sheet for recording desired data on a recording sheet of paper.

2. Description of the Prior Art

Conventional copying machines utilize diazo photography or xerography.

Copying machines which operate on the principle of diazo photography employ a photosensitive sheet of paper that is superposed on an original to be copied and exposed to produce a recorded image. A disadvantage of such copying machines is that only one copy can be made from a single original in one copying operation. Therefore, it is extremely troublesome to produce a number of copies of one original. Another problem is that only transparent or semitransparent originals can be copied.

Xerographic copying machines include an electrostatic recording drum or sheet for producing an electrostatic latent image thereon, which is developed with toner into a toner image. The toner image is then transferred and thermally fixed to a recording sheet to produce a recorded image. The xerographic copying machine can produce a number of copies in one operation by subjecting the original to repeated exposure, and suffers from no limitation on the types of originals that can be copied. However, a drawback of the xerographic copying machine is that a large amount of electric power is consumed in fixing a toner image to a recording sheet. In addition, because the fixing unit emits a large quantity of heat, the copying machine requires a heat shielding mechanism and an exhaust mechanism for protecting circuit components from the heat discharged from the fixing unit. Therefore, the copying machine is large and expensive to manufacture.

The xerographic copying process which utilizes static electricity in forming latent images also has the disadvantage of being sensitive to its environment. It may fail to transfer an image properly when the recording sheet is dampened due to high humidity.

SUMMARY OF THE INVENTION

In view of the difficulties possessed by conventional copying machines, it is an object of the present invention to provide a copying machine which can produce a number of copies from a single original in one copying operation, while consuming a reduced amount of electric power, and which is small, inexpensive to manufacture, and also which is relatively insensitive to its environment.

According to the present invention, there is provided a copying machine including a platen of glass for supporting an original to be copied, a scanner unit reciprocally movable with respect to the platen for reading the original line-by-line to produce an image signal, a thermal head for selectively generating thermal pulses in response to the image signal from the scanner unit, an ink donor sheet supply means for supplying the thermal head with an ink donor sheet coated with a thermal transfer ink which can be fluidized or sublimated upon being heated, a recording sheet feed means for feeding a recording sheet in the vicinity of the thermal head, a recording sheet contacting means for bringing the recording sheet into intimate contact with a heating section of the thermal head through the ink donor sheet, and a recording sheet discharge means for discharging the recording sheet peeled off the ink donor sheet after an image has been recorded on the recording sheet.

This thermal image transfer process achieves the foregoing objects because no such thermal fixing process is used. Therefore, the recording assembly is smaller in size.

These and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

First Embodiment

General Arrangement of Copying Machine

Figure 1:
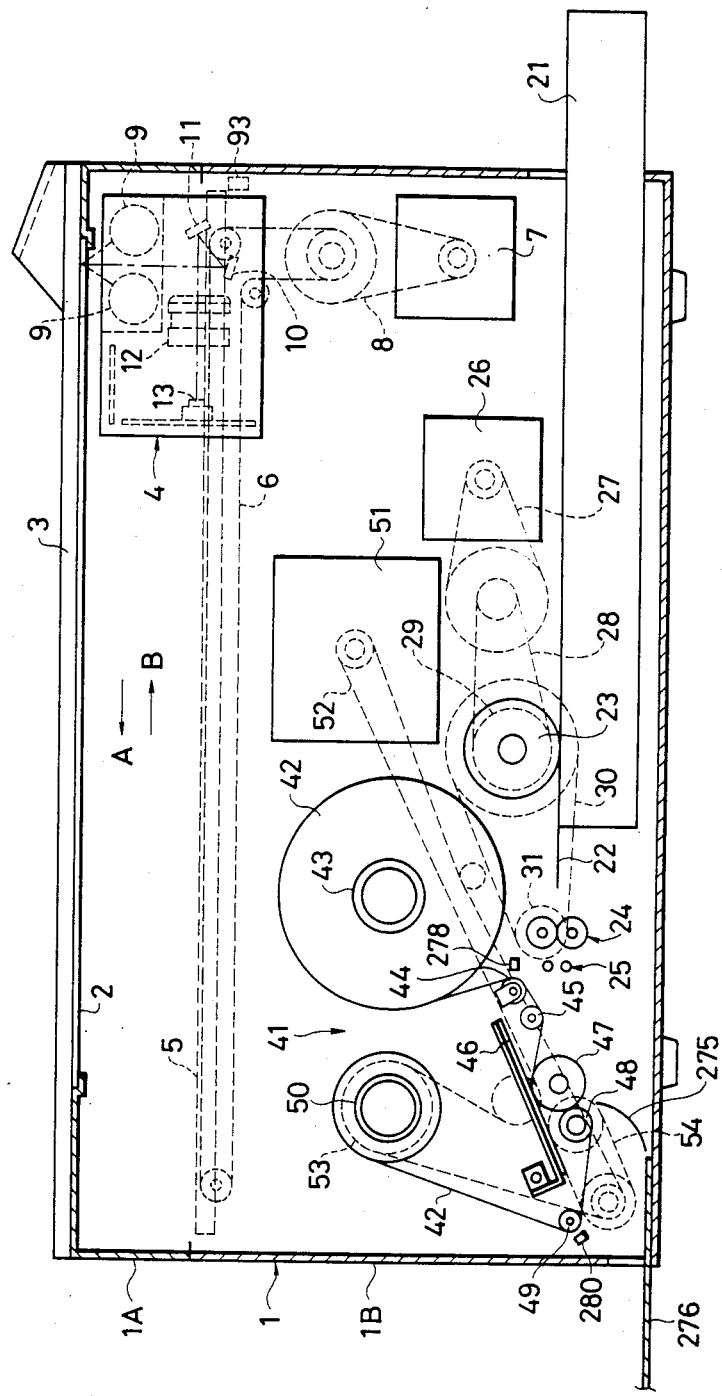
FIG. 1 is a schematic side elevation view of a copying machine according to a first embodiment of the present invention.

FIG. 1 shows the general arrangement of a copying machine according to a first embodiment of the present invention.

The copying machine has a housing 1 which supports a glass platen 2 on its upper portion. An original to be copied is placed on platen 2. A platen cover 3, which can be opened and closed, disposed over platen 2 to hold down the original on platen 2. A scanner unit 4 is disposed below platen 2 and movable along guide rails 5 in the directions of the arrows A, B. Scanner unit 4 is coupled by belts 6 and 8 to a scanner motor 7 positioned in the copying machine housing 1. When the scanner motor 7 is energized, belts 6 and 8 move scanner unit 4 in the directions of the arrows A, B.

Scanner unit 4 includes two fluorescent lamps 9 slightly longer than the width of platen 2. It also includes several reflecting mirrors 10 and 11 which are disposed below the fluorescent lamps 9. A light beam reflected from the original is successively reflected and transmitted by reflecting mirrors 10 and 11 through a preset light path to an optical lens 12. The optical lens 12 produces a light image which is then converted by an image sensor 13 into an analog electric image signal. Reflecting mirrors 10 and 11 are employed to make the scanner unit 4 compact regardless of the length of the light path.

A sheet cassette 21 is mounted in the copying machine housing 1 so that it may be removed. The sheet cassette 21 contains a stack of recording sheets 22 with its upper sheet held in pressed contact with a feed roller 23. The feed roller 23 is positioned behind a pair of register rollers 24 which are located behind a register sensor 25 composed of a light-emitting element and a photodetector. When a sheet feed motor 26 in the housing 1 is energized, the feed roller 23 is rotated in a prescribed direction through belts 27, 28 and an electromagnetic clutch 29. Register roller 24 is rotated in a prescribed direction through a belt 30 and an electromagnetic clutch 31.

The housing 1 accommodates a recording assembly 41. The recording assembly 41 includes an ink donor sheet 42 wound around a supply roll 43. The ink donor sheet 42 is composed of base paper such as condenser paper coated on one surface thereof with a thermally transferable black ink which can be fluidized or sublimated upon being heated.

The ink donor sheet 42 unreeled from the supply roll 43 and moves past a wrinkle-removing automatic balancing roller 44 and a guide roller 45. Sheet 42 then moves between a thermal head 46 and a back roller 47 where an image is recorded on the ink donor sheet 42 by a thermal head 46. Then, ink donor sheet 42 is passed between the back roller 47 and a drive roller 48 and is finally wound past a guide roller 49 around a takeup roll 50. A step motor 51 is energized to rotate takeup roll 50 through a belt 52 and a slip clutch 53. At the same time, drive roller 48 is rotated through a belt 54.

The operation of the copying machine now will be described in greater detail.

Control Panel

Figure 2:
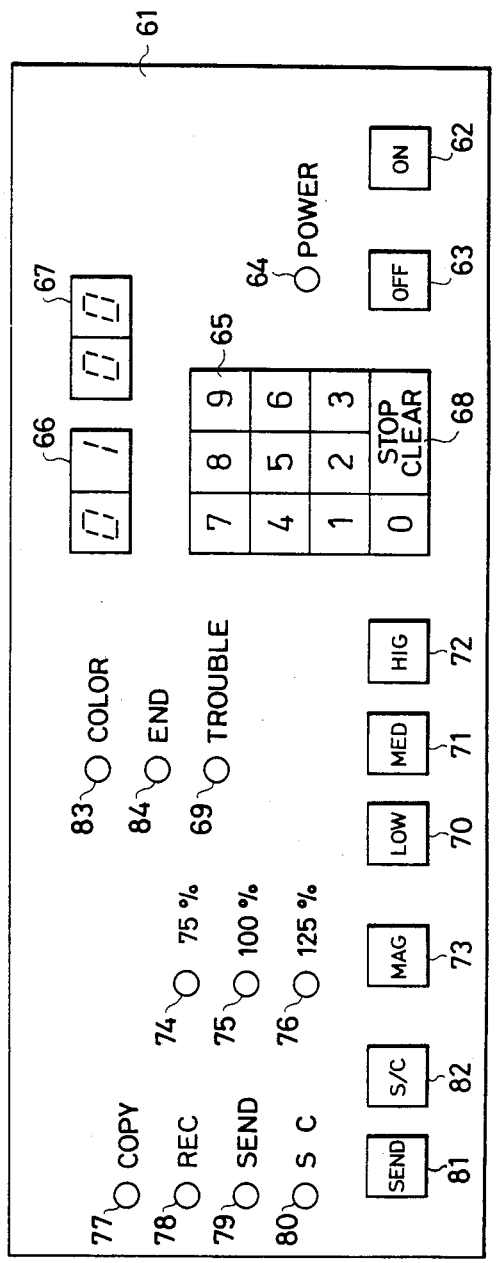
FIG. 2 is a plan view of a control panel of the copying machine shown in FIG. 1.

FIG. 2 shows a control panel 61 of the copying machine.

There are many buttons, indicators, and two counters on the control panel 61. A power supply ON button 62 and a power supply OFF button 63 turn the power supply ON and OFF. When the power supply is ON, a power indicator 64 is lighted indicating, together with indications on the other indicators, to the operator that the copying machine is ready for copying operation. A ten-key pad 65 includes buttons for setting the number of copies to be produced, the number thus set being indicated on a set counter 66. An output counter 67 positioned adjacent to set counter 66 successively indicates the number of copies which have been produced. The copying operation is finished when the indications on the counters 66, 67 coincide with each other. When it is desired to change the number indicated on the set counter 66, a STOP/CLEAR button 68 is pressed and then the desired number of copies is entered again through the ten-key pad 65. When, however, the ten-key pad 65 is depressed at least 5 seconds after the number of copies has been set in the set counter 66, the new number of copies is set in the set counter 66 even if the STOP/CLEAR button 68 is not depressed.

The STOP/CLEAR button 68 is also used when the operator wants to stop the operation of the copying machine. When the recording sheet or the ink donor sheet is jammed in the copying machine or the copying machine malfunctions, a sensor in the copying machine detects such a paper jam or malfunction and stops the operation of the copying machine without depression of the STOP/CLEAR button 68. When this happens, a trouble indicator 69 flickers to let the operator know that a problem exists. The trouble indicator 69 continues flickering until the operator corrects the problem and then presses the STOP/CLEAR button 68. While the trouble indicator 69 is flickering, the copying machine will not resume its operation even if start buttons 70, 71, 72 are depressed.

The start buttons 70, 71, and 72 serve to start the copying operation, and also to select recording densities by slightly varying the amount of thermal energy emitted by the thermal head 46. When the original is to be copied at a low density, the first start button 70 is depressed by the operator. When the original is to be copied at a normal density, the second start button 71 is depressed by the operator. When the original is to be copied at a high density, the third start button 72 is depressed by the operator.

A magnification setting button 73 is to the left of start buttons 70 through 72. Each time the magnification setting button 73 is depressed, the copying magnification is cyclically changed from 125% to 100% to 75%, and the selected copying magnification is indicated by indicators 74 through 76.

Four mode indicators 77 through 80 are positioned on the lefthand end of the control panel 61. Under the normal condition, the copy indicator 77 is energized to indicate that the copying machine is in a copying mode. When an image signal is supplied from an external device (not shown), the reception indicator 78 is energized to indicate that the copying machine is in a receiving mode in which the copying machine serves as a recorder for the external device. When a sending or transmitting button 81 is depressed, the transmission indicator 79 is lighted to indicate that the copying machine is in a transmitting mode in which the copying machine serves as a reader of the external device. When a transmitting/copying button 82 is depressed, the transmitting/copying indicator 80 is energized to indicate that the copying machine is in a transmitting/copying mode. The relationship between the copying machine and the external device will be described below.

Two indicators 83 and 84 for indicating ink donor sheet conditions are positioned above the trouble indicator 69. The color indicator 83 is lighted when the color of ink of the ink donor sheet is other than black, for example, red. The end indicator 84 is lighted when the remaining length of the ink donor sheet becomes small. Mechanisms for detecting the ink color and the remaining length of the ink donor sheet will be described below.

Image Reading and Processing

After an original to be copied has been placed on the platen 2 shown in FIG. 1, the operator depresses the power supply ON button 62 on the control panel 61. The power supply of the copying machine is switched on and the power indicator 64 is lighted.

Figure 3:
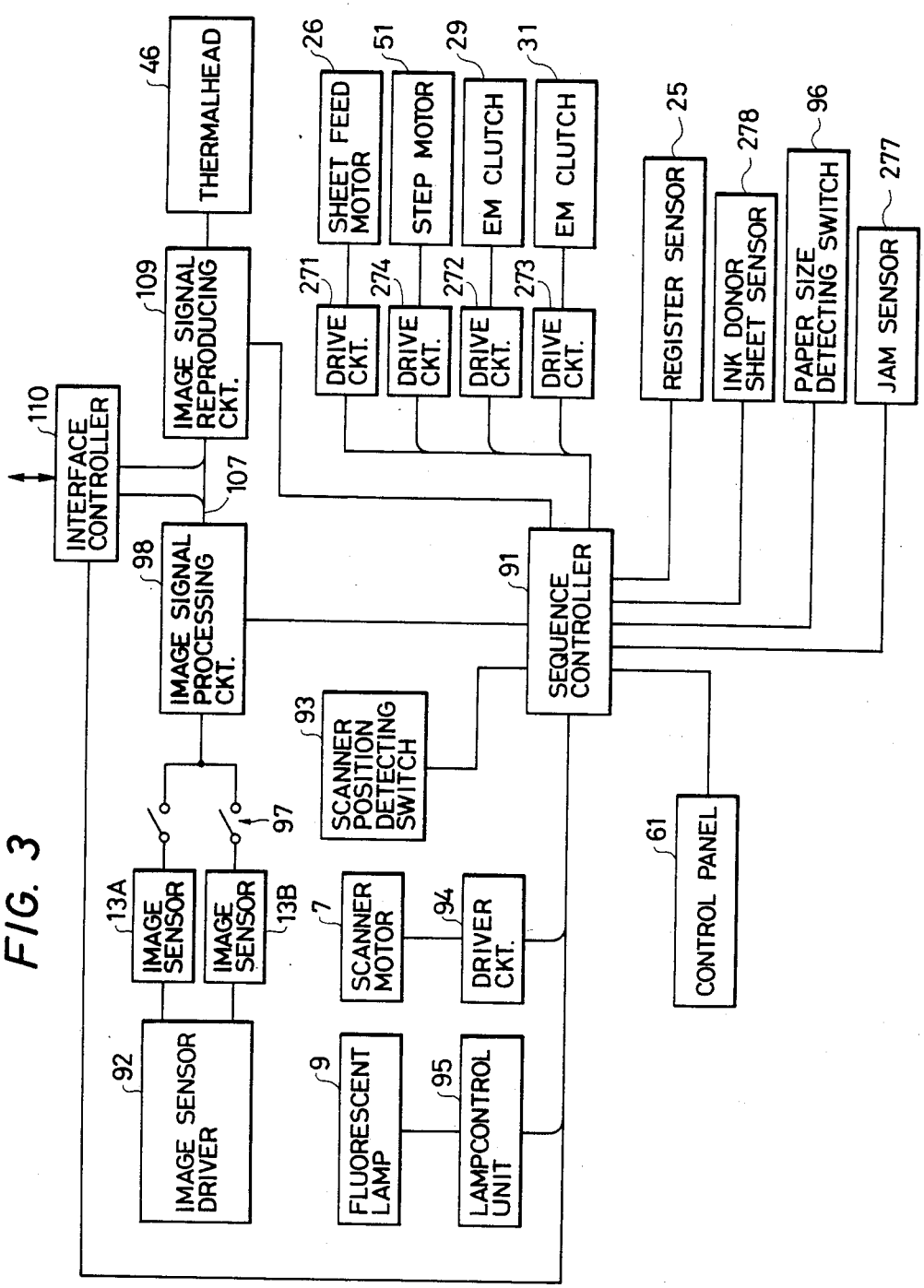
FIG. 3 is a block diagram of an electric circuit of the copying machine of FIG. 1.

FIG. 3 illustrates an electric circuit of the copying machine. The electric circuit may be in the copying machine housing 1 or may be in a separate casing in order to make the copying machine housing 1 more compact.

When any one of the start buttons 70 through 72 shown in FIG. 2 is pressed, a sequence controller 91 ascertains whether the copying machine is operable or not. If the copying machine is free from any malfunctions and can operate normally for recording, then the sequence controller 91 supplies a drive signal to an image sensor driver 92 and simultaneously ascertains whether or not the scanner unit 4 (FIG. 1) is in a home position. This evaluation is based on positional information delivered from a scanner position detecting switch 93 adjacent to an end of the guide rail 5 as shown in FIG. 1. If the scanner unit 4 is not in the home position, then the sequence controller 91 supplies a drive signal to a motor driver circuit 94 to energize the scanner motor 7 for setting the scanner unit 4 to the home position. The sequence controller 91 contains a timing mechanism for measuring the time required for such setting of the scanner unit 4. When the scanner unit 4 is not set to the home position within the prescribed time, the sequence controller 91 determines that the copying machine has suffered a malfunction. Then, the sequence controller 91 stops the drive signal from being supplied to the motor drive circuit 94 and energizes the trouble indicator 69.

When the scanner unit 4 is set to the home position within the prescribed time, the position of the scanner unit 4 is confirmed by the scanner position detecting switch 93. Thereafter, the sequence controller 91 supplies a drive signal to a lamp control unit 95 at a given timing to energize the fluorescent lamp 9. The sequence controller 91 also supplies a drive signal to the motor drive circuit 94 to rotate the scanner motor 7 in a normal direction or a reverse direction for reciprocating the scanner unit 4.

When the set counter 66 shown in FIG. 2 is set to "1" so that only one copy is to be produced, the sequence controller 91 enables the scanner unit 4 to read the image information of the original on a forward stroke of the scanner unit 4. When auxiliary scanning in the direction of arrows A, B corresponding to the size of the original in the direction of arrows A, B has occurred, the sequence controller 91 reverses the direction of rotation of the scanner motor 7 and shortens the period of drive pulses issued from the motor drive circuit 94 so that scanner motor 7 rapidly returns scanner unit 4 to the home position.

When two or more copies are to be produced, scanner unit 4 reads the image information not only on its forward stroke, but also on its return stroke. The scanner unit 4 moves at equal speeds on the forward and return strokes. Sequence controller 91 determines the distance which the scanner unit 4 moves in the direction of the auxiliary scanning based on the size of the original or information on the size of recording paper obtained from a paper size detecting switch 96 and a copying magnification selected by the magnification selecting button 73 on the control panel 61.

When the scanner unit 4 moves on its forward stroke or its forward and return strokes, two image sensors, 13A, 13B in image sensor 13, read one line at divided intervals and convert a light image into an electric signal for each line.

Each of image sensors 13A, 13B in the copying machine of the present invention comprises a CCD (Charge-Coupled Device) line sensor or a photodiode array composed of 2048 photoelectric transducers arrayed at intervals of 1/12 mm. By using more than one image sensor for reading the image, the length of the optical path between the original and the image sensors can be reduced, and the scanner unit 4 may be more compact in size. The image sensors 13A, 13B are supplied with an image signal clock from the image sensor driver 92 for issuing analog image signals for respective pixels in synchronism with the supplied image signal clock. The image signals are supplied to an image signal processing circuit 98 through two switches 97 which are alternately closed and opened.

The image signal processing circuit 98 removes noise from the image signals such as by correcting the shading. The image signal processing circuit 98 has a white-line skipping capability for skipping a next line to be read when it is entirely blank. Therefore, the image sensors 13A, 13B have image detecting elements capable of simultaneously reading at least two lines. The image signal processing circuit 98 also has the ability to convert the line density and the ability to generate a halftone image signal.

Line Density Conversion

The term "line density conversion" means the conversion of an image signal read by the image sensors 13A, 13B and having a line density of 12 dots/mm to an image signal according to a magnification selected by the magnification selecting button 73 (FIG. 2). For example, when the selected magnification is 100% (equal size), 12 dots/mm are converted to 8 dots/mm. When the selected magnification is 75% (size reduction to ¾), 12 dots/mm are converted to 6 dots/mm. When the selected magnification is 125% (size enlargement to 5/4), 12 dots/mm are converted to 10 dots/mm.

Generation of Halftone Image Signal

The image signal processing circuit 98 converts the line-density-converted image signal to a three-valued image signal for digital recording, and generates an image signal which is reconstructed with an N×N dot matrix so that 15 tones can be represented by three-valued signals. The three-valued signals correspond to recording densities of white, gray, and black. The copying machine of this embodiment employs the thermal transfer recording system and can only effect two-valued recording. In such an arrangement, the density or size of an output dot is varied to achieve two states by changing the energy of a thermal pulse applied from the thermal head to the ink donor sheet, thus expressing the density of black in two pseudostates. The density or size of an output dot is defined as the ratio of the portion of an area that is darkened to the full portion of that area, whether or not darkened.

Figure 4:
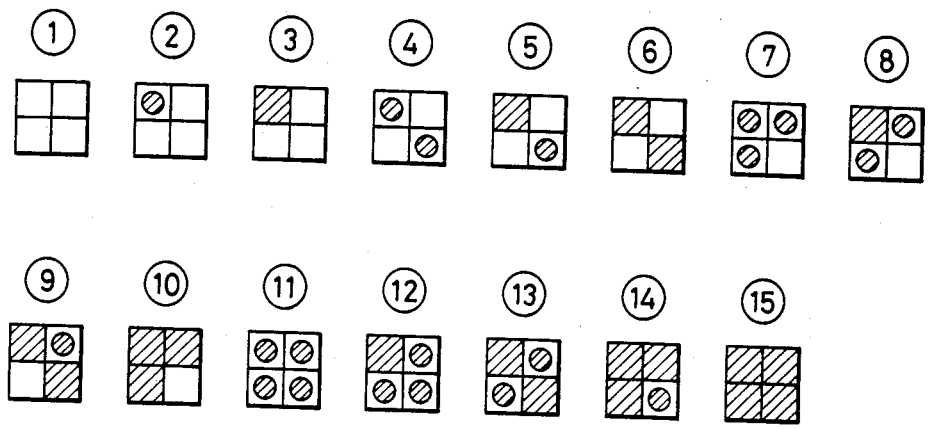
FIG. 4 is a view of fifteen tones each expressed by a 2×2 dot matrix.

FIG. 4 shows 15 tones each expressed by a 2×2 dot matrix where the numeral N is 2, each output dot being one of the three-state tone levels "0," "1," and "2." The tone level "1" for an output dot is indicated by the hatched circle in FIG. 4 and represents the size of a dot which is relatively low in density or small in a unit matrix corresponding to the output dot. The tone level "2" for an output dot is indicated by the hatched square in FIG. 4 and represents the size of a dot which is relatively high in density or large in a unit matrix corresponding to the output dot. The tone level "0" is indicated by a white square and represents white (background) where no printing is effected in a unit matrix. The dots in the 2×2 dot matrix are arranged with no clearance between them on the recording surface, thus achieving the 15-tone expression in black. The copying machine of the present embodiment employs a three-value process for generating halftone image signals of the 2×2 dot matrix.

Figure 5:
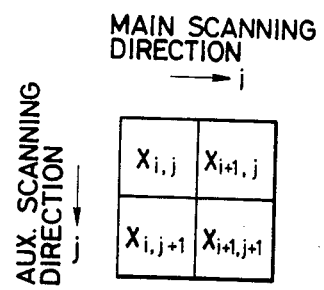
FIG. 5 is a diagram of the positional relationship of four pixels in a 2×2 dot matrix used in a three-value process.
Figure 6:
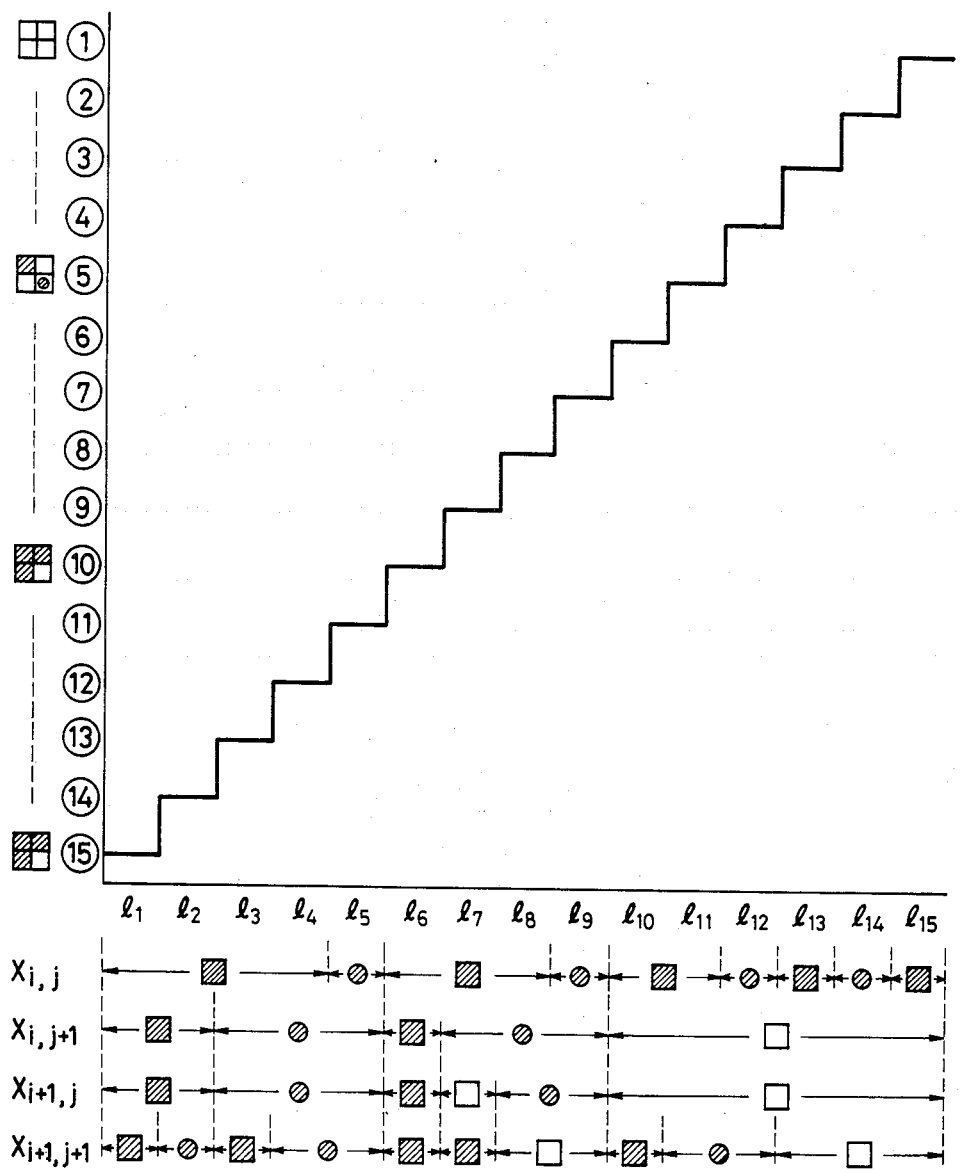
FIG. 6 is a diagram showing the printing characteristics of the 2×2 dot matrix.

FIG. 5 shows the relationship between the four pixels $X_{i,j}$ through $X_{i+1,j+1}$ in the 2×2 dot matrix produced by the three-value process. In FIG. 5, the main scanning direction for reading and recording images is indicated by i, and the auxiliary scanning direction for reading and recording images is represented by j. The four pixels $X_{i,j}$ through $X_{i+1,j+1}$ are quantized by different threshold levels, respectively. For example, as shown in FIG. 6, the image signal for the pixel $X_{i,j}$ is expressed by the 15-tones $l_1$ through $l_{15}$ as follows:

(i) Tone level "2"

$$X_{i,j} = l_1 \sim l_4, l_6 \sim l_8, l_{10}, l_{11}, l_{13}$$

(ii) Tone level "1"

$$X_{i,j} = l_5, l_9, l_{12}, l_{14}$$

(iii) Tone level "0"

$$X_{i,j} = l_{15}$$

The horizontal axis in FIG. 6 represents the tones $l_1$ through $l_{15}$, with the tone $l_1$ being darkest and the tone $l_{15}$ being brightest. The vertical axis in FIG. 6 indicates the densities 1 through 15 expressed by the 2×2 dot matrix. For example, when the image signal is of the darkest tone $l_1$, the pixels $X_{i,j}$ through $X_{i+1,j+1}$ are all of the tone level "2", thus producing the density 15.

Figure 7:
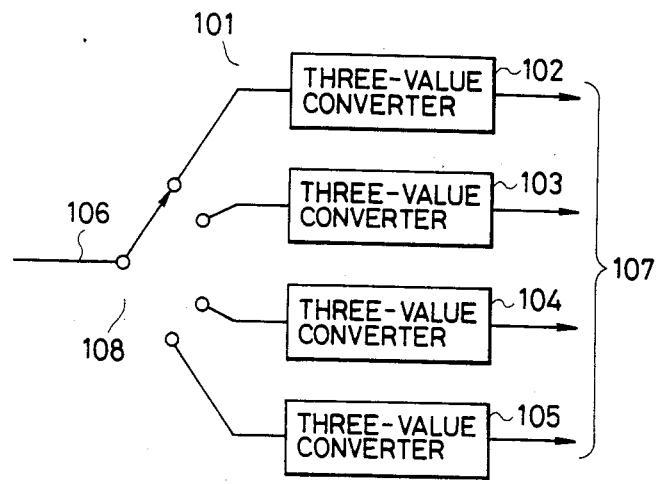
FIG. 7 is a block diagram of a halftone image signal generator circuit.

FIG. 7 schematically shows a halftone image signal generating circuit 101 composed of three-value converters 102 through 105, each comprising comparators and logic circuits. The first three-value converter 102 has eight digital comparators having eight threshold levels for an image signal 106 corresponding to the pixel $X_{i,j}$. By logically processing the results of comparison, the first three-value converter 102 issues a halftone image signal 107 representative of one of the tone levels "0" through "2." The second three-value converter 103 has four digital comparators having four threshold levels for the pixel $X_{i,j+1}$, and issues a three-valued halftone image signal 107. The third three-value converter 104 has five digital comparators, and the fourth three-value converter 105 has nine digital comparators. The converters 104, 105 issue halftone image signals 107 respectively for the pixels $X_{i+1,j}$ and $X_{i+1,j+1}$. A switching circuit 108 supplies the image signal 106 alternatively to the three-value converters 102 through 105. In the (i)th line, the first and second three-value converters 102, 103 are selected for each pixel. In the (i+1)th line, the third and fourth three-value converters 104, 105 are selected for each pixel. Each of the halftone image signals 107 is a three-valued image signal which selectively represents any one of the 15 densities per matrix when it is recorded as a 2×2 dot matrix.

The halftone image signals 107 generated by the image signal processing circuit 98 are supplied to an image signal reproducing circuit 109.

External Interface

Figure 8:
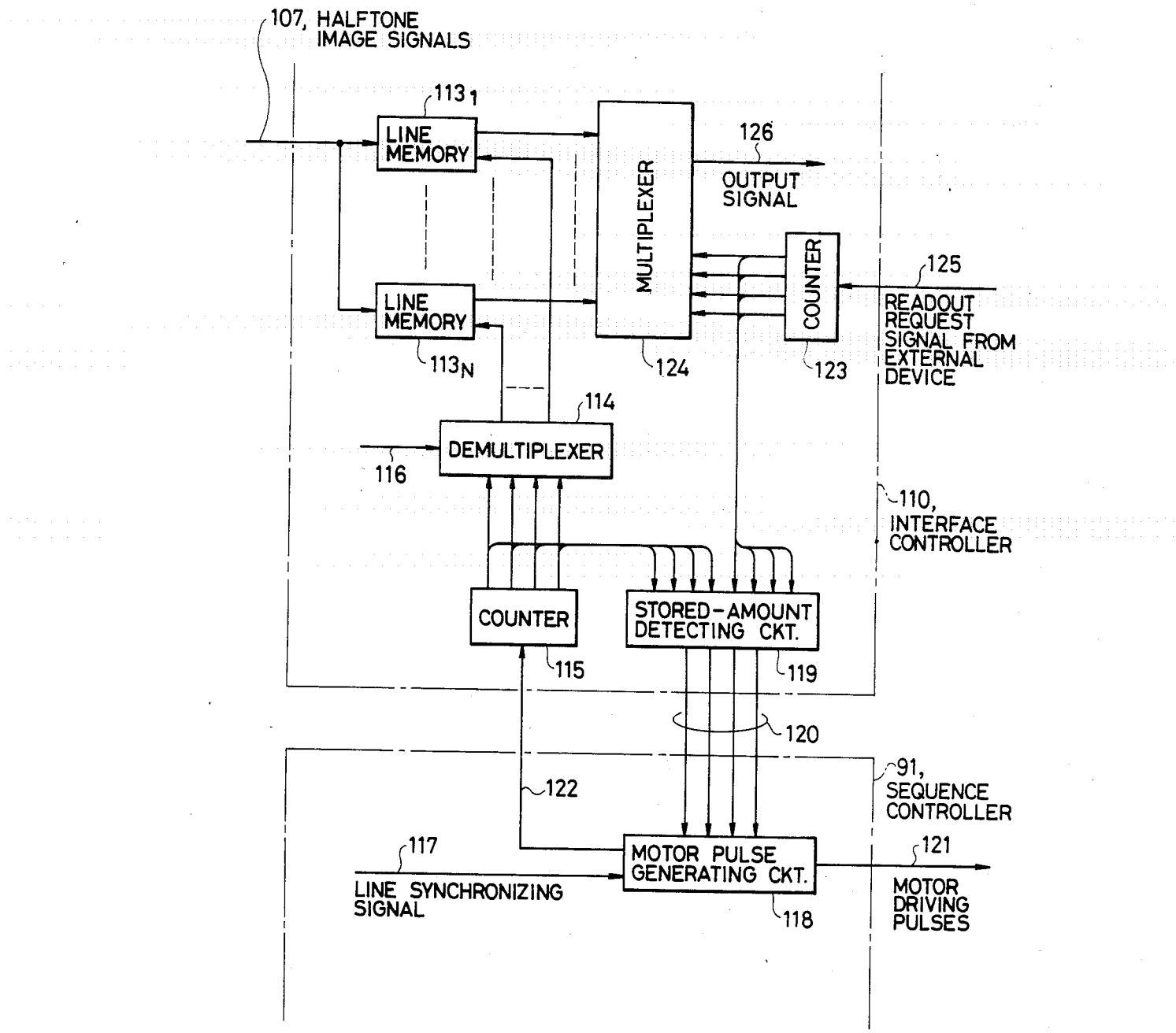
FIG. 8 is a block diagram of an interface control unit and a sequence control unit.

The copying machine has an interface controller 110 shown in FIGS. 3 and 8. The halftone image signals 107 can be transmitted as a series signal through the interface controller 110 to an external device (not shown). More specifically, the interface controller 110 may have an external transmitting terminal (not shown) for connection through a modem to a telephone circuit, an interoffice communication circuit, or a radio communication circuit. Conversely, the copying machine may be used as a recorder of the external device by providing a receiving terminal for receiving a series three-valued image signals, supplying the received signal through a modem or the interface controller 110 to the image signal reproducing circuit 109 where the signal is processed as described below. The processed signal is used to energize the thermal head 46 for recording.

Where the halftone image signals 107 are to be processed by an external device, the recording operation of the external device may not be carried out at the same speed because of synchronism with the circuit or interrupt processing. However, the scanner unit 4 continuously reads the original with the image sensor 13. Accordingly, the interface controller 110 of the copying machine has line buffers for temporarily storing the image signals. Interface controller 110 also controls the auxiliary scanning effect by the scanner unit 4 based on the amount of the stored signals. This value is based on the total number of stored lines and will be discussed further below.

The variable control of the auxiliary scanning speed can cause the scanner unit 4 to vibrate mechanically, resulting in a reading position error. Vibration can be prevented by driving the scanner unit 4 at an equal degree of acceleration for a certain period of time. To accomplish such a driving mode, it is necessary to detect the amount of untransmitted image signals due to the difference between the reading speed and the transmitting speed. Such detection allows for proper control of the driving of step motor 7.

FIG. 8 shows such portions of the interface controller 110 and the sequence controller 91 which are arranged to effect such control. The interface controller 110 has a plurality of line memories $113_1$ through $113_N$ serving as buffer memories. A demultiplexer 114 selects one of the line memories $113_1$ through $113_N$ through provision of a count value issued from a counter 115 and operates in synchronism with write pulses 116 issued from the scanner unit 4 (FIG. 1) for writing one line of halftone image signals 107.

A line synchronizing signal 117 issued from the scanner unit 4 is supplied to a motor pulse generating circuit 118 in the sequence controller 91. The motor pulse generating circuit 118 is also supplied with signals 120 indicative of the number of signals due to the total number of lines stored in the line memories $113_1$ through $113_N$, from a stored-amount detecting circuit 119 in the interface controller 112. Depending on the stored amount of signals due to the total number of stored lines of halftone image signals 107, the motor pulse generating circuit 118 frequency-divides the line synchronizing signal 117 and issues motor driving pulses 121 and write request pulses 122. The motor driving pulses 121 are supplied to the motor driving circuit 94. Each time a motor driving pulse 121 is generated, the scanner motor 7 advances the scanner unit 4 in the auxiliary scanning direction to the next line to be read.

The write request pulse 122 is a signal for requesting the demultiplexer 114 to write the halftone image signals 107, the signal being supplied to the counter 115 which counts up by one. The count value of the counter 115 is delivered to the stored-amount detecting circuit 119 and the demultiplexer 114. Dependent on the supplied count value, the demultiplexer 114 successively selects the line memories $113_1$ through $113_N$ to enable them to write the halftone image signals 107 in synchronism with the write pulse 116 each time a line is subjected to auxiliary scanning.

The interface controller 110 also has a counter 123, for reading an image signal, and a multiplexer 124. The counter 123 is supplied from the external device or the like with a readout request signal 125 for requesting readout for one line. Each time the readout request signal 125 is supplied, the counter 123 counts the signal, and the resulting count value is fed to the multiplexer 124 and the stored-amount detecting circuit 119. The multiplexer 124 is supplied with parallel halftone image signals 107 from the line memories $113_1$ through $113_N$, each of the image signals corresponding to a different line to be outputted. Multiplexer 124 then issues the image signal of the line memory selected by the count value of the counter 123 as an output signal 126. The line memories $113_1$ through $113_N$ are selected in the same order as that in which they are selected by the demultiplexer 114.

The stored-amount detecting circuit 119 ascertains the difference between the counts of the counters 115, 123 for detecting the number of stored signals. The stored number of signals is expressed by S, and the normal speed of the scanner unit 4 for auxiliary scanning is set to M stages (M=2) depending on the stored number of signals. There are therefore established (M−1) accelerating conditions and (M−1) decelerating conditions, and the scanner unit 4 is accelerated and decelerated under the selected one of the accelerating and decelerating conditions. The M normal speeds, denoted $V_1$ through $V_M$, corresponding to the stored amount S of signals, the positive accelerations, denoted $\alpha_1$ through $\alpha_{M-1}$, and the negative accelerations, denoted $\beta_1$ through $\beta_{M-1}$, are related to each other as shown in the following Table 1:

TABLE 1

| Stored Amount | Normal Speed | Acceleration | Deceleration |
|---|---|---|---|
| $S_0 \leq S \leq S_1$ | $V_1$ | $\alpha_1$ | $\beta_1$ |

TABLE 1-continued

| Stored Amount | Normal Speed | Acceleration | Deceleration |
|---|---|---|---|
| $S_1 \leq S \leq S_2$ | $V_2$ | $\alpha_2$ | $\beta_2$ |
| $S_2 \leq S \leq S_3$ | $V_3$ | $\alpha_3$ | $\beta_3$ |
| . | . | . | . |
| . | . | . | . |
| . | . | . | . |
| $S_{M-2} \leq S \leq S_{M-1}$ | $V_{M-1}$ | $\alpha_{M-1}$ | $\alpha_{M-1}$ |
| $S_{M-1} \leq S \leq S_M$ | $V_M$ | | |

If the number of signals stored in all of the line memories $113_1$ through $113_N$ is $S_1 < S < S_2$, the normal speed is $V_2$. For changing from the normal speed $V_1$ to the higher normal $V_2$, the accelerating condition is controlled according to the selected positive acceleration $\alpha_1$. Conversely, for changing from the normal speed $V_3$ to the lower normal speed $V_2$, the decelerating condition is controlled according to the selected negative acceleration $\beta_2$.

Figure 9:
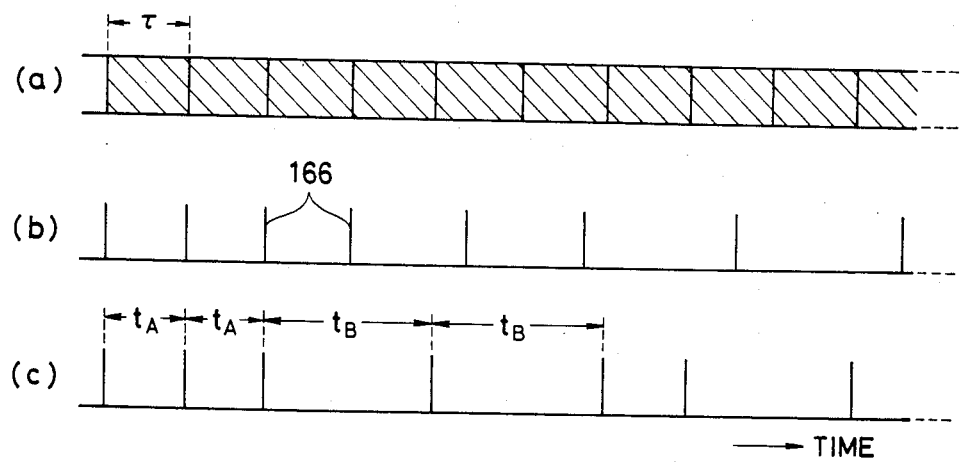
FIG. 9 is a diagram showing the timing relationship between a scanner unit and the recording assembly of an external device.

FIG. 9 shows the timing relationship between the scanner unit 4 and the recorder of the external device. In the scanner unit 4, the image sensor 13 reads the image at a prescribed period $\tau$(FIG. 9(a)). The generation of the motor driving pulses 121 (FIG. 9(b)) issued from the sequence controller 91 is controlled based on the number of the stored halftone image signals. This controls the sampling of the halftone image signals. FIG. 9(c) illustrates line recording intervals in the recorder of the external device. The illustrated recorder establishes two recording speeds depending on the ratio of output dots in one line. Where there are few output dots, one line is printed in the time $t_A$ (for example, 2.5 ms), and where there are many output dots, the thermal head is driven discretely to print one line in the time $t_B$ (for example, 5.0 ms). The intervals at which the motor driving pulses 166 are generated are controlled to change gradually as shown in FIG. 9(b) even when the line recording speeds vary frequently as shown in FIG. 9(c).

Figure 10:
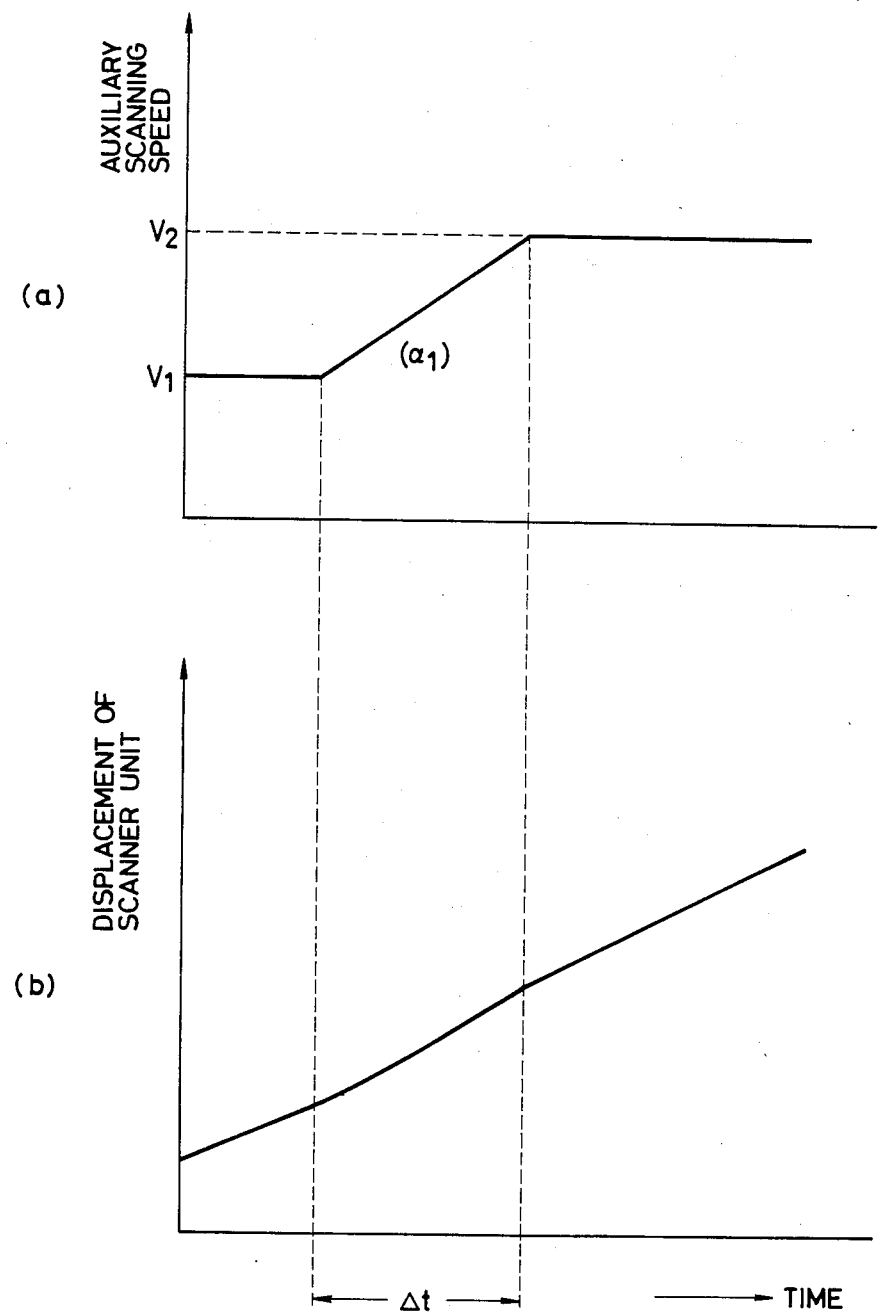
FIG. 10 is a set of diagrams used to explain speed control of the scanner unit.

FIG. 10 illustrates an actual implementation of such speed control. If the auxiliary scanning speed varies from the normal speed $V_1$ to the other normal speed $V_2$ as shown FIG. 10(a), there is the accelerating condition $\alpha_1$ for a time interval $\Delta t$ between these two normal speeds. Therefore, the scanner unit 4 is continuously displaced as shown in FIG. 10(b) to avoid any readout error.

Signal Processing of Image Signal Reproducing Circuit

The image signal reproducing circuit 109 writes every one line of halftone image signals 107 serially in a memory thereof, and reads out the stored signals in a forward or reverse direction depending on the direction in which the scanner unit 4 (FIG. 1) is scanned. More specifically, as described above, the scanner unit 4 reads image signals on forward and return strokes when a plurality of copies are produced from one original. Since the scanner unit 4 reads the image signals in a forward sequence on its forward stroke and in a reverse sequence on its return stroke, the image recorded on the return stroke would be a mirror image unless the image signals were rearranged. Therefore, the signals are read out of the memory in the image signal reproducing circuit 111 in the forward direction on the forward stroke and in the reverse direction in the reverse stroke. However, such rearrangement of the image signals will not be required if only one copy is produced from the original or the image signals are received from an external receiving terminal.

The halftone image signals read out of the memory are converted from the serial form to the parallel form for being supplied to the thermal head 46, so that one block of parallel image signals is successively generated which correspond to unit heating bodies that are driven for one line or discretely. These parallel image signals are then delivered to a recording-width control circuit in which those halftone image signals are cut off when they correspond to a region other than the recording region of the thermal head 46 and the region for contact with the ink donor sheet 42. To effect such signal cutoff, the sequence controller 91 issues size information supplied from the paper size detecting switch 96 to the image signal reproducing circuit 109. Recording width is limited to the size of the recording paper which prevents the back roller 47, shown in FIG. 1, from being smeared when an unnecessary region of the ink donor sheet 42 is heated.

The halftone image signals from the recording-width control circuit is then supplied to a recording-density selecting circuit which controls the voltage (or pulse duration) of an applied pulse for printing each dot, in black, as commanded by the control panel 61. The halftone image signal thus processed is then supplied to a thermal-storage correcting circuit.

Thermal Storage Correction

The apparatus for thermally recording images with an ink donor sheet or the like, such as the copying machine of the present embodiment, employs as a recording head a thermal head composed of an array of unit heating bodies or heating elements. Since the thermal head generates thermal energy at the time of printing, an image, the image may be deteriorated by previously generated thermal energy stored in the thermal head. The thermal head has different thermal storage conditions based on the past energizing patterns of the individual unit heating bodies. The unit heating bodies have varying temperatures due to heat transfer between themselves and the other surrounding unit heating bodies. In order to print the tone levels "2" and "1" at their prescribed recording densities, it is necessary to adjust the pulse durations slightly and effect the same control over the peak values of pulses applied to the unit heating bodies.

Figure 11:
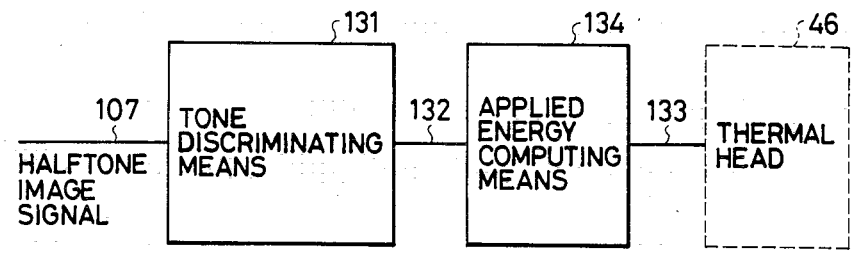
FIG. 11 is a block diagram showing a thermal head driving device.

As shown in FIG. 11, the copying machine of the present embodiment includes a thermal head driving device composed of a tone discriminating means 131, an applied energy computing means 134 and a thermal head 46. Tone discrimination means 131 discriminates from the halftone image signal 107 the tone to be printed for an output dot combination to which an output dot to be printed now belongs. Depending on a discriminated tone 132, the applied-energy computing means 134 computes an energy 133 to be applied to a unit heating body of the thermal head 46 which corresponds to the output dot to be printed now. The output dot combination referred to above means a combination of plural output dots, such as the foregoing 2×2 dot matrix, employed as a minimum unit for expressing a tone.

Figure 12:
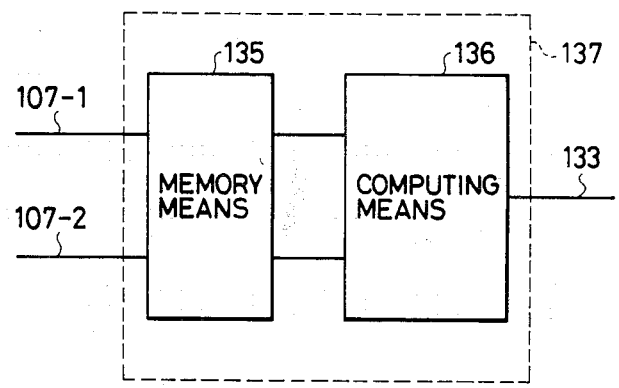
FIG. 12 is a block diagram of an applied-energy computing means and a tone discriminating means which are combined together.

The applied-energy computing means 134 may be combined with the tone discriminating means 131. More specifically, as illustrated in FIG. 12, an applied-energy computing means 137 may be composed of a memory means 135 and a computing means 136. The memory means 135 stores a halftone image signal 107-1 corresponding to the output dot to be printed next and a halftone image signal 107-2 corresponding to the region surrounding the output dot. The computing means 136, which may employ a ROM (Read-Only Memory), computes an energy to be applied to a unit heating body of the thermal head based on the halftone image signals 107-1, and 107-2, that thermal energy corresponds to the output dot to be printed and depends on the tone to be printed of the output dot's combination.

Figure 13:
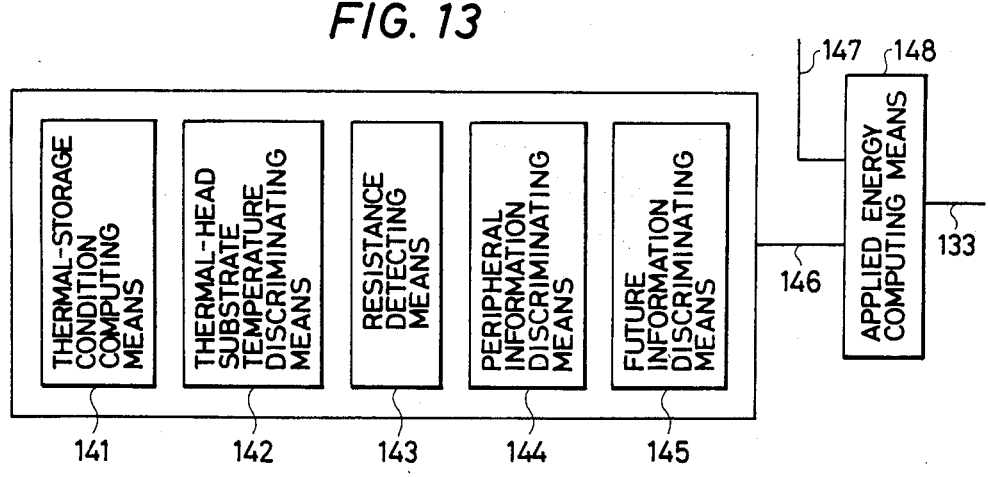
FIG. 13 is a block diagram illustrating examples of information that can be applied to the applied-energy computing means.

The applied-energy computing means 134 or 137 may be supplied with other information for printing tones more accurately. More specifically, as shown in FIG. 13, the thermal head driving device may be provided with various means for obtaining information to compensate for the effects of previously generated thermal energy stored in the thermal head. For example, there could be (1) a thermal-storage condition computing means 141 for computing the thermal-storage condition of each unit heating body of the thermal head, (2) a thermal-head substrate temperature discriminating means 142 for discriminating an average temperature or a temperature distribution of the thermal head substrate, (3) a resistance detecting means 143 for detecting the resistance of each unit heating body of the thermal head, (4) a peripheral information discriminating means 144 for discriminating the peripheral image data of the next output dot to be printed for adjusting the thermal energy to be applied to print the dot, or (5) a future information discriminating means 145 for discriminating the future image data with respect to the next output dot to be printed for adjusting the thermal energy to be applied to print the dot. Where the thermal head driving device has any or all of the above means, it should also have an applied-energy computing means 148 supplied with information 146 from one or more of the above means as well as with tone-level information 147 for computing the energy to be applied to each unit heating body of the thermal head which corresponds to the output dot.

The applied-energy computing means 134 or 137 may be composed of a means for computing the energy to be applied to each unit heating body of the thermal head and for computing the time duration of the pulse to be applied to each unit heating body. The information on the time duration of a pulse to be applied includes not only information representing the time duration of the pulse, but also information indicating quantized time duration. For example, a thermal head driving device which controls pulses to be applied with the number of unit pulses of a unit time duration, may compute information representative of the number of unit pulses as information on the time duration.

Since the thermal head driving device of the copying machine discriminates a tone level with the tone level discriminating means and computes an energy to be applied to a unit heating body of the thermal head based on the discriminated tone level, the halftone can be printed with desired printing characteristics by appropriately increasing or decreasing the applied energy for each tone level. Depending on the thermal head driving device, it is also possible to provide a plurality of printing characteristics by providing a plurality of applied-energy computing means or varying the computing mode.

The general arrangement of the thermal head driving device will be described below.

Figure 14:
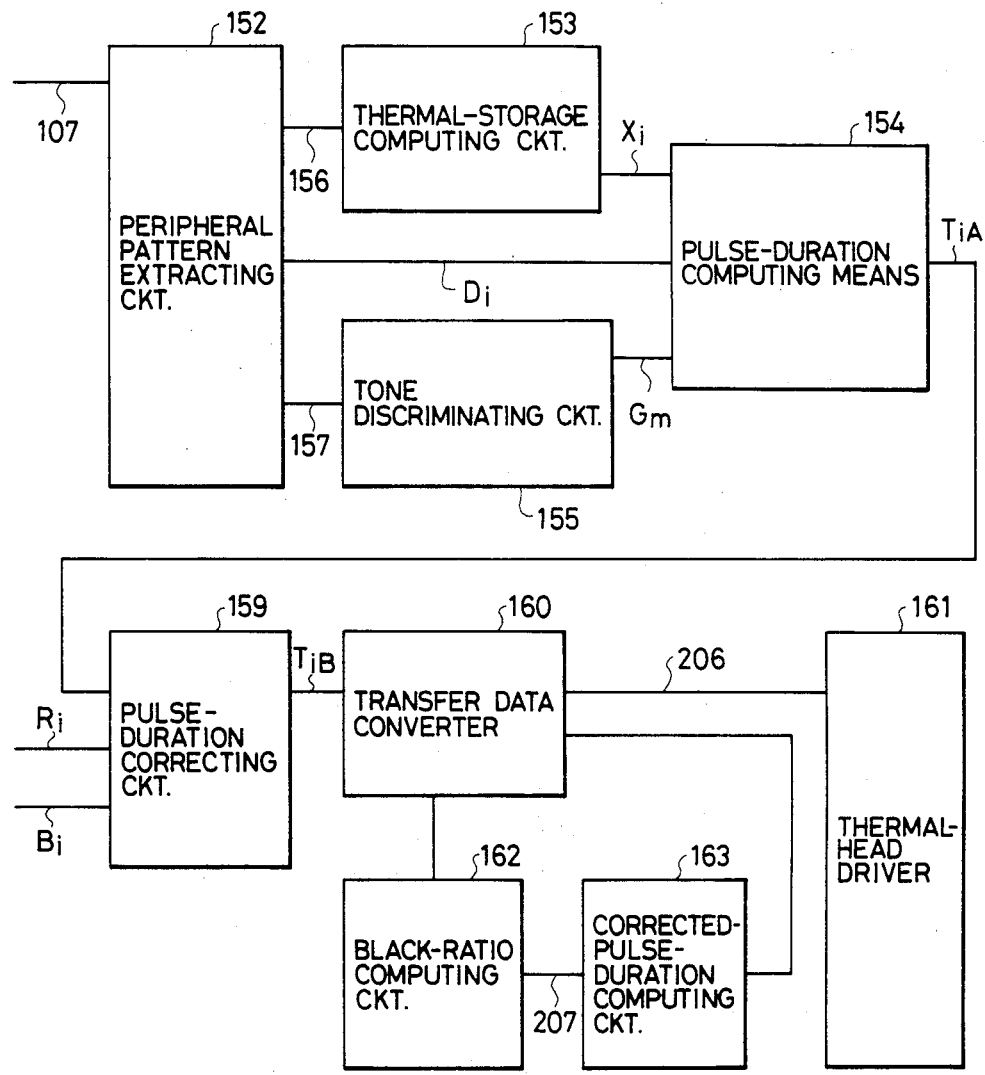
FIG. 14 is a block diagram of the thermal head driving device.

General Arrangement of Thermal Head Driving Device:

FIG. 14 shows a general arrangement of the thermal head driving device. The thermal head driving device includes a peripheral pattern extracting circuit 152 supplied with an image signal 107 for feeding necessary information to a thermal-storage computing circuit 153, a pulse-duration computing circuit 154, and a tone discriminating circuit 155. The thermal-storage computing circuit 153 is supplied with present and past image data 156 from the peripheral pattern extracting circuit 152. Circuit 153 computes the printing energy contribution from previously stored thermal energy to a dot (data of interest) with respect to which a printing energy is to computed. Thermal storage level data Xi determined by the thermal-storage computing circuit 153 is then supplied to the pulse-duration computing circuit 154. The tone discriminating circuit 155 is supplied with present and future image data 157 from the peripheral pattern extracting circuit 152 for discriminating an output dot to which the data of interest belongs from the 15 tones of the 2×2 dot matrix. The 15 tones are as shown in FIG. 4 and will be referred to as tone patterns 1 through 15.

Tone pattern date Gm, indicative of the tone pattern discriminated by the tone discriminating circuit 155, and data Di of interest are supplied to the pulse-duration computing circuit 154. Based on the supplied data Xi, Di, Gm, the pulse-duration computing circuit 154 determines a printing pulse duration TiA to be used when printing the data Di of interest. The printing pulse duration TiA is supplied to a pulse-duration correcting circuit 159 which is also supplied with resistance data Ri, indicating the resistance of each unit heating body of the thermal head, and substrate temperature data Bi, representing the temperature of the thermal head substrate. The pulse-duration correcting circuit 159 corrects the printing pulse duration TiA based on the resistance data Ri and the substrate temperature data Bi.

The printing pulse duration TiB thus corrected for each unit heating body is converted by a transfer data converter 160 into transfer data for each unit printing operation, the transfer data being applied through a thermal head driver 161 to the thermal head. If many dots are to be printed at a time, a large current flows in the thermal head, resulting in a relatively large voltage drop. To prevent this, the proportion of dots to be printed at a time is computed by a black-ratio computing circuit 162, which increases pulses to be printed dependent on the computed proportion, thus preventing the printing energy from being reduced. A corrected pulse-duration computing circuit 163 serves to compute the time duration of a corrected pulse to be printed.

The circuits of the thermal head driving device thus outlined will be described in greater detail.

Peripheral Pattern Extraction

Figure 15:
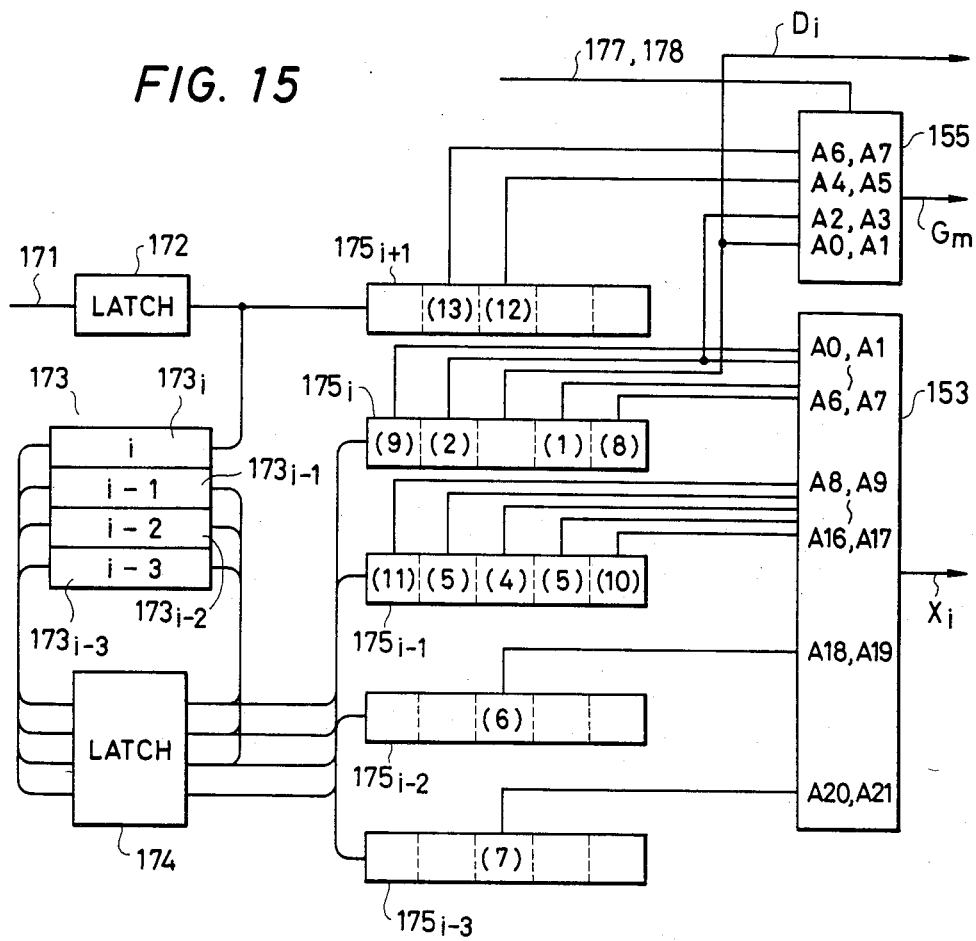
FIG. 15 a block diagram of a circuit for extracting a peripheral pattern.

FIG. 15 shows the peripheral pattern extracting circuit and related circuitry. An image signal 171 is a signal series produced by reading every line (raster) of image data, the tones of which are expressed by 2×2 dot matrixes. The image signal 171 is supplied to the thermal head driving device as a 2-bit signal series expressing the tone level of each output dot.

The image signal 171 of this format is latched two bits at a time by a latch circuit 172 and then written in an i line memory 173$i$ in a line memory group 173. The $i$ line memory 173$i$ serves to store one line of image signals to be recorded. Two-bits of image signal, which are pushed out of the $i$ line memory 173$i$ in synchronism with an image signal clock (not shown), are latched by a latch circuit 174 and written in an $i-1$ line memory 173$i-1$, and also applied to an $i$ line shift register 175$i$. The $i$ line shift register 175$i$ is composed of two parallel 5-stage shift registers, as are the other shift registers 175$i+1$ and 175$i-1$ through 175$i-3$. The $i$ line shift register 175$i$ is supplied individually with a bit series indicative of whether the tone level of a dot to be printed is "1" or "0" and also with a bit series indicative of whether the tone level of an output dot is "2" or "0" for serial/parallel conversion.

The $i-1$ line memory 172$i-1$ serves to store one line of past image signals and operates to delay the image signals 171 by one line. Two-bits of image signal which are pushed out of the $i-1$ line memory 173$i-1$ are latched by the latch circuit 174 and written in an $i-2$ line memory 173$i-2$ in the line memory group, and also applied to the $i-1$ line shift register 175$i-1$. Image signals are similarly delayed by one line in the line memory group 173, and the delayed image signals are supplied to the $i-2$ line shift register 175$i-2$ and the $i-3$ line shift register 175$i-3$.

The image signal latched by the latch circuit 172 is also applied to the $i+1$ line shift register 175$i+1$. Since the $i$ line shift register 175$i$ stores the image signals for the next line to be recorded, the $i+1$ line shift register 175$i+1$ stores the future image signal. Two-bit reference data issued from the second-stage flip-flop of the $i+1$ line shift register 175$i+1$ is supplied as parallel bits respectively to input terminals A6, A7 of a ROM of the tone discriminating circuit 155. Two-bit reference data issued from the third-stage flip-flop of the $i+1$ line shift register 175$i+1$ is supplied to input terminals A4, A5 of the tone discriminating circuit 155. Four-bit reference data issued simultaneously from the second- and third-stage flip-flops of the $i$ line shift register 175$i$ are supplied respectively to input terminals A2, A3, A0, A1 of the tone discriminating circuit 15. The two-bit data issued from the third flip-flop is the data Di of interest which is also supplied to the pulse-duration computing circuit 154 (FIG. 14).

Reference data issued from the first-, second-, fourth-, and fifth-stage flip-flops of the $i$ line shift register 175$i$ are applied to input terminals A0 through A7 of a ROM of the thermal-storage computing circuit 153. Reference data from all stages of the $i-1$ line shift register 175$i-1$ are supplied to input terminals A8 through A17 of the thermal-storage computing circuit 153. Two-bit reference data issued from the third flipflop of each of the $i-2$ and $i-3$ line shift registers 175$i-2$, 175$i-3$ are applied to input terminals A18, A19, A20, A21 of the thermal-storage computing circuit 153.

Figure 16:
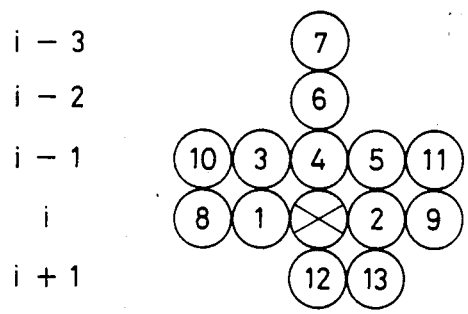
FIG. 16 is a diagram showing the correspondence relationship of reference data in a recorded image.

FIG. 16 shows the positional relationship, on a recorded image, of the reference data issued from the five shift registers 175$i+1$ through 175$i-3$ constituting the peripheral pattern extracting circuit. The numerals (1) through (13) shown in FIG. 15 correspond respectively to the numbers 1 through 13 of the dots shown in FIG. 16. The output dot indicated by x in FIG. 16 corresponds to the data Di of interest.

Computation of Thermal Storage Condition

Figure 17:
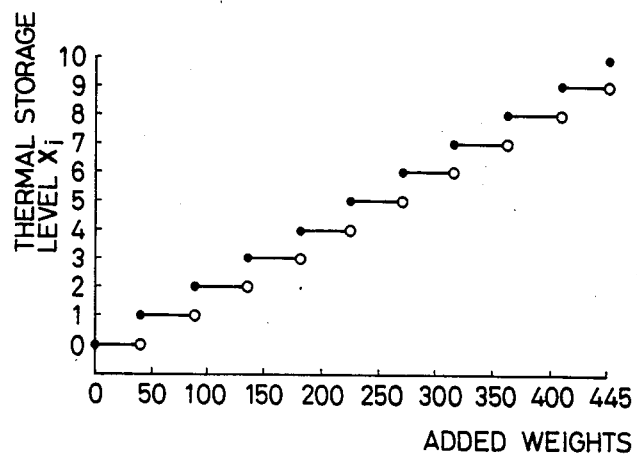
FIG. 17 is a diagram explanatory of data stored in a ROM which is used in computing a stored heat level $X_i$.
Figure 18:
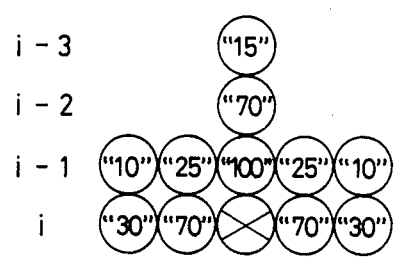
FIG. 18 is a diagram showing the weights of respective tone levels of output dots corresponding to the reference data at the time the tone levels are "2"
Figure 19:
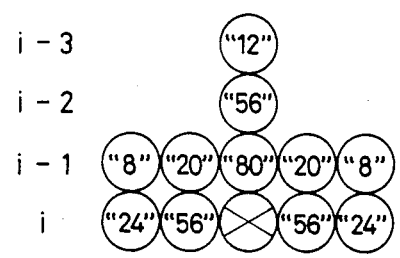
FIG. 19 is a diagram showing the weights of respective tone levels of output dots corresponding to the reference data at the time the tone levels are "1"

The thermal storage computing circuit 153 computes the thermal storage condition of a unit heating body which prints data of interest based on the 22-bit reference data supplied to the input terminals A0 through A21 of the thermal storage computing circuit 153. The thermal storage computing circuit 153 weights each reference data and adds the weights of all the data. Based on the sums of the weighted data, a ROM outputs a thermal storage level Xi. FIG. 17 shows the content of the ROM in the thermal storage computing circuit 153. The data positions in FIGS. 18 and 19 correspond to those in FIG. 16 and show the weights of the reference bits. FIG. 18 illustrates the weighting when output dots of the tone level "2" are printed, and FIG. 19 shows the weighting when output dots of the tone level "1" are printed. The weights of output dots of tone level "2" are greater since the thermal storage effect of the data D1 of interest in the printing is greater because the energy applied to print level "2" output dots is larger.

The effect of thermal storage is maximum when all 11 reference-data output dots surrounding the data of interest are of tone level "2," giving an added weight sum of 455. The corresponding maximum thermal storage level data Xi at this time is maximum or "10" (in decimal notation). When only the reference data on both sides of the data of interest in the $i$ line, for example, are to be printed and the tone level of these output dots are "1," the sum is 112 and the thermal storage level Xi is "2." The ROM of the thermal-storage computing circuit 153 stores the thermal storage level data Xi with respect to the sum with each reference data used as addressing information. The thermal storage level data Xi read out as 4-bit data which is part of an addressing input for the pulse-duration computing circuit 154.

Tone Discrimination

The tone discriminating circuit 155 discriminates a tone pattern to which the data of interest belongs from the 15 tone patterns 1 through 15, each composed of a 2×2 dot matrix, based on the 8-bit reference data and the data of interest which are supplied to the input terminals A7 through A0. For such discrimination, the tone discriminating circuit 155 is supplied with a scanning start signal 177 indicating the start of scanning for each line and a video clock 178 for dividing the object to be discriminated every two pixels in the main scanning direction for every two lines to discriminate the tone pattern based on the so-called pattern matching process.

Figure 20:
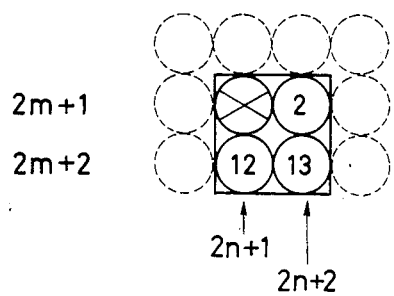
FIG. 20 is a diagram explanatory of the principle of discriminating a tone.
Figure 21:
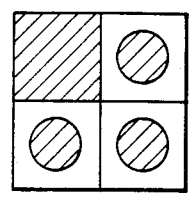
FIG. 21 is a diagram of a 2×2 dot matrix.

FIG. 20 is illustrative of the tone pattern discrimination. The tone discriminating circuit picks up four dots, i.e., the (2n+1)th and (2n+2)th (n=0, 1, 2, ... ) dots in (2m+1)th and (2m+2)th lines (m=0, 1, 2, ... ) to discriminate the tone pattern of the 2×2 dot matrix of such dots. The dot indicated by x and corresponding to the data of interest is printed at this time as the (2n+1)th output dot in the (2m+1)th line. These four dots are compared with the tone level of each output dot constituting the tone pattern in the ROM of the tone discriminating circuit 155, thus discriminating the tone pattern to which the data of interest belongs. For example, if the dot matrix as shown in FIG. 21 is picked up, then it is determined to be the tone pattern 12 out of the tone patterns 1 through 15 as shown in FIG. 4. The discriminated result is stored in a memory (not shown) in the tone discriminating circuit 155 and then issued as tone pattern data Gm in synchronism with the readout of the data Di of interest of the corresponding dot matrix. Therefore, at the time the tone pattern is identified and at the time a next video clock is supplied, the same tone pattern data Gm is issued, and the same tone pattern data Gm is also issued in the same main scanning position in the next line. Tone pattern data Gm is thus issued for every 2×2 dot matrix. The tone pattern data Gm, the thermal storage level data Xi, and the data Di of interest are supplied as addressing inputs for the pulse-duration computing circuit 154.

Computation of Applied Pulse Duration

The pulse-duration computing circuit 154 determines a temporary applied pulse duration based on the supplied addressing information. The determined pulse duration is temporary since the pulse duration will be corrected by the pulse-duration correcting circuit 159.

Figure 22:
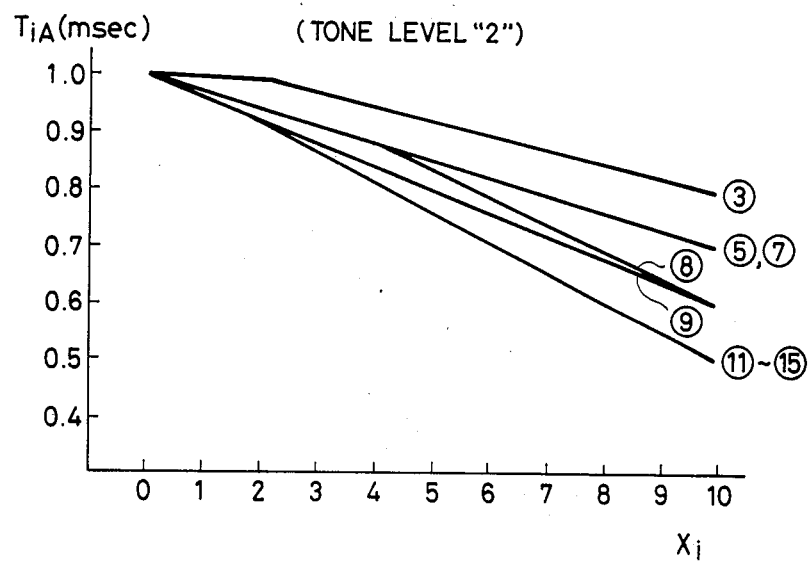
FIG. 22 is a diagram showing data stored in the ROM which is used in computing a printing pulse width TiA at the time the tone level is "2"
Figure 23:
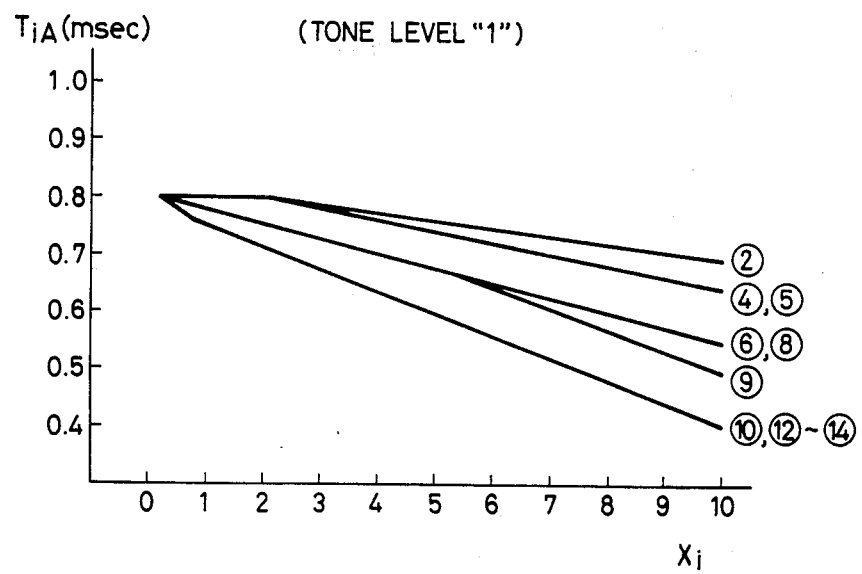
FIG. 23 is a diagram showing data stored in the ROM, used in computing a printing pulse width TiA at the time the tone level is "1"

FIGS. 22 and 23 show the content of a ROM constituting the pulse-duration computing circuit 154. FIG. 22 illustrates the ROM content at the time the data Di of interest indicates the printing of an output dot of the tone level "2," and FIG. 23 shows the ROM content at the time the data Di of interest indicates the printing of an output dot of the tone level "1." The numerals in circles are representative of tone patterns. For example, if the output dot of the data of interest is of tone level "2" and belongs to a dot matrix of tone pattern 12, and also if the thermal storage level data Xi is 8, then the applied pulse duration TiA is 0.6 msec. If the output dot of the data of interest is of tone level "1" under the same condition, then the applied pulse duration TiA is 0.48 msec. FIG. 22 does not show the applied pulse durations TiA for the tone patterns 1, 2, 4, 6, and 10 because output dots of the tone level "2" are not used with these tone patterns. FIG. 23 also does not show the applied pulse durations TiA for the tone patterns 1, 3, 7, 11, and 15 for the same reason.

Correction of Applied Pulse Duration

The applied pulse duration TiA thus determined is then corrected by the pulse-duration correcting circuit 159 dependent on the resistance Ri and the substrate temperature Bi. The resistance-dependent correction to the applied pulse duration is effected in order to keep the heating energy constant irrespective of different resistances of the unit heating bodies of the thermal head. The resistances of the thermal head unit heating bodies vary in the range of ±25%, and the average resistances of different thermal heads vary 200 to 300 ohms from each other. The resistance data supplied to the pulse-duration correcting circuit 159 indicate the resistances of the individual unit heating bodies.

Figure 24:
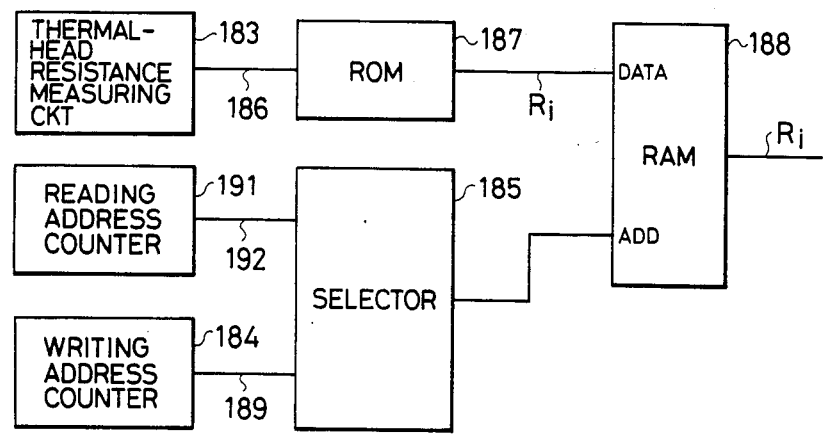
FIG. 24 is a block diagram of an arrangement for generating resistance information Ri.

FIG. 24 shows a circuit arrangement for generating resistance data Ri. The circuit arrangement has a thermal-head resistance measuring circuit 183 including an A/D converter. While a writing address counter 184 is selected by a selector 185, the thermal-head resistance measuring circuit 183 measures the resistances of the unit heating bodies of the thermal head one at a time. The measured result is supplied to a bit-conversion ROM 187 as an 8-bit resistance measurement 186 (which has 256 stages at maximum). The bit-conversion ROM 187 converts the resistance measurement 186 into 3-bit resistance data Ri based on the following Table 2:

TABLE 2

| Resistance measurement (ohm) | Resistance data Ri |
| --- | --- |
| r < 500 | 000 |
| 500 ≦ r < 600 | 001 |
| 600 ≦ r < 700 | 010 |

TABLE 2-continued

| Resistance measurement (ohm) | Resistance data Ri |
| --- | --- |
| 700 ≦ r < 800 | 011 |
| 800 ≦ r < 900 | 100 |
| 900 ≦ r < 1000 | 101 |
| 1000 ≦ r < 1100 | 110 |
| 1100 ≦ r | 111 |

The resistance data Ri thus determined serve as input data for a RAM 188. At this time, the RAM 188 is supplied with addressing information 189, through selector 185, issued from the writing address counter 184 to enable the matching of resistance data Ri to its corresponding unit heating body. Likewise, each time the writing address counter 184 counts up, the resistance data Ri of a unit heating body is written into the RAM 188. The resistance data Ri may be stored each time the copying machine is switched on, or may be stored continuously for a long time by energizing the RAM 188 with a backup battery.

The resistance data Ri stored in the RAM 188 is read out when an applied pulse duration TiB is determined. For reading out the resistance data Ri, the selector 185 selects a reading address counter 191 which issues addressing information 192 corresponding to a unit heating body for which the applied pulse duration TiB is determined. The RAM 188 then reads the resistance data Ri for the desired unit heating body and supplies the same to the pulse-duration correcting circuit 159.

Figure 25:
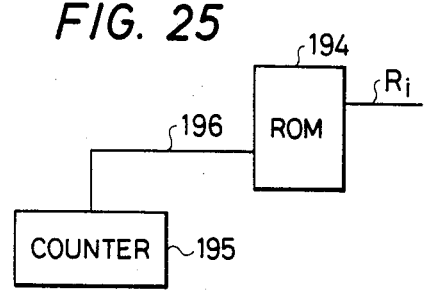
FIG. 25 is a block diagram which refers to the explanation of certain elements of FIG. 24.

FIG. 25 shows a circuit arrangement for issuing resistance data Ri using a ROM storing measured resistances. A ROM 194 stores the resistance data Ri of the individual unit heating bodies of the thermal head. When a counter 195 supplies addressing information 196 indicating the unit heating bodies individually, the corresponding resistance data Ri is read out of the ROM 194.

Figure 26:
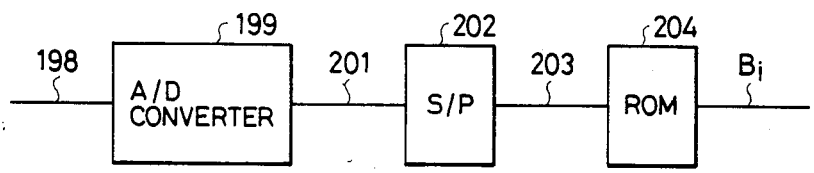
FIG. 26 is a block diagram of an arrangement for generating substrate temperature information Bi.

The substrate temperature data Bi of the thermal head will be described below. FIG. 26 shows a circuit arrangement in the thermal head driving device for generating the substrate temperature data Bi. A thermosensitive element such as a thermistor is attached to the substrate, not shown, of the thermal head. A detected output 198 from the thermosensitive element is applied to an A/D converter 199 which converts the applied signal to 8-bit serial data 201. The serial data 201 is then supplied to serial/parallel converter 202 and converted thereby to 8-bit parallel data 203 indicative of the temperature. The parallel data 203 serves as an addressing input for a ROM 24 for computing the substrate temperature data Bi. The following Table 3 shows the relationship between substrate temperatures t indicated by the parallel data 203 and substrate temperature data Bi:

TABLE 3

| Substrate temperature t (°C.) | Substrate temp. data Bi |
| --- | --- |
| 0 ≦ t ≦ 10 | 000 |
| 10 ≦ t ≦ 18 | 001 |
| 18 ≦ t ≦ 26 | 010 |
| 26 ≦ t ≦ 30 | 011 |
| 30 ≦ t ≦ 34 | 100 |
| 34 ≦ t ≦ 42 | 101 |
| 42 ≦ t ≦ 50 | 110 |
| 50 ≦ t ≦ 60 | 111 |

The substrate temperature data Bi determined by the ROM 204 is then supplied to the pulse-duration correcting circuit 159.

The pulse duration correcting circuit 159 corrects the applied pulse duration TiA based on the resistance data Ri and the substrate temperature data Bi, thereby generating an applied pulse duration TiB which varies in the range of from 1.2 to 0.2 msec.

Figure 27:
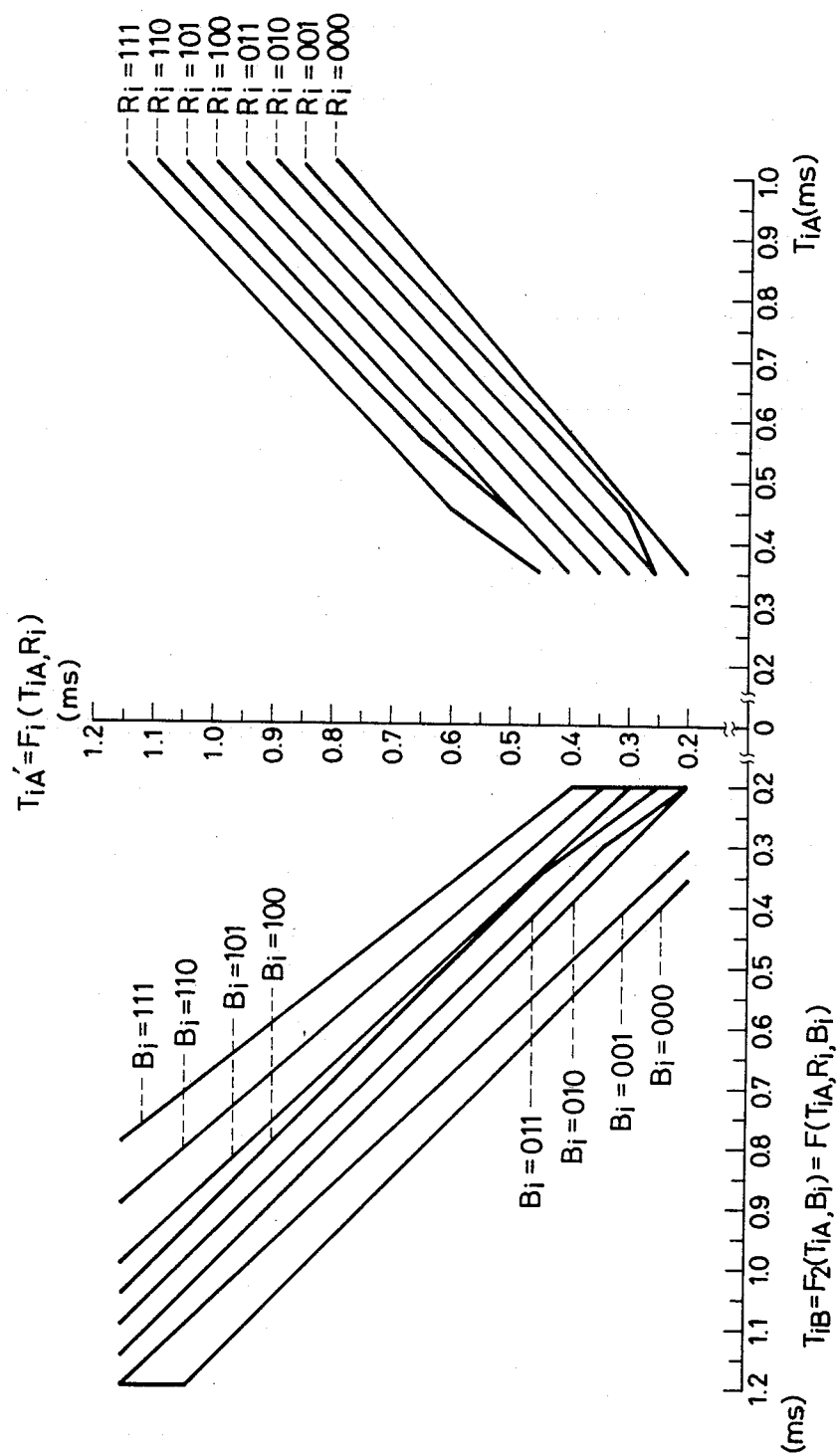
FIG. 27 is a diagram showing data stored in the ROM which is used in computing printing energy information TiB.

FIG. 27 shows the relationship between the applied pulse duration TiB and the information based on which the pulse duration TiB is generated. The applied pulse duration TiB read out of the pulse-duration correcting circuit 159 is information which does not represent the pulse duration itself but rather the number of unit pulses, each having a duration of 0.05 msec. For example, when the applied pulse duration TiA is 0.7 msec. and the resistance information Ri is "010", TiA' is 0.6 msec. If the substrate temperature information Bi is "100" at this time, then the applied pulse duration TiB is 0.5 msec. In this example, the data indicative of 10 (in decimal notation) as the number of unit pulses each of 0.05 msec. is issued as the applied pulse duration TiB from the pulse-duration correcting circuit 159.

The data on the applied pulse duration TiB issued from the pulse-duration correcting circuit 159 is fed to the transfer data converter 160 which converts the supplied data to transfer data 206, which is then supplied to the thermal head driver 161. The content of the transfer data 206 is also supplied to the black-ratio computing circuit 162 which produces the count data 207 on which the duration of a pulse to be applied is finally determined by the corrected-pulse computing circuit 163. The thermal head and the thermal head driver 161 employed in the thermal head driving device will now be described.

Figure 28:
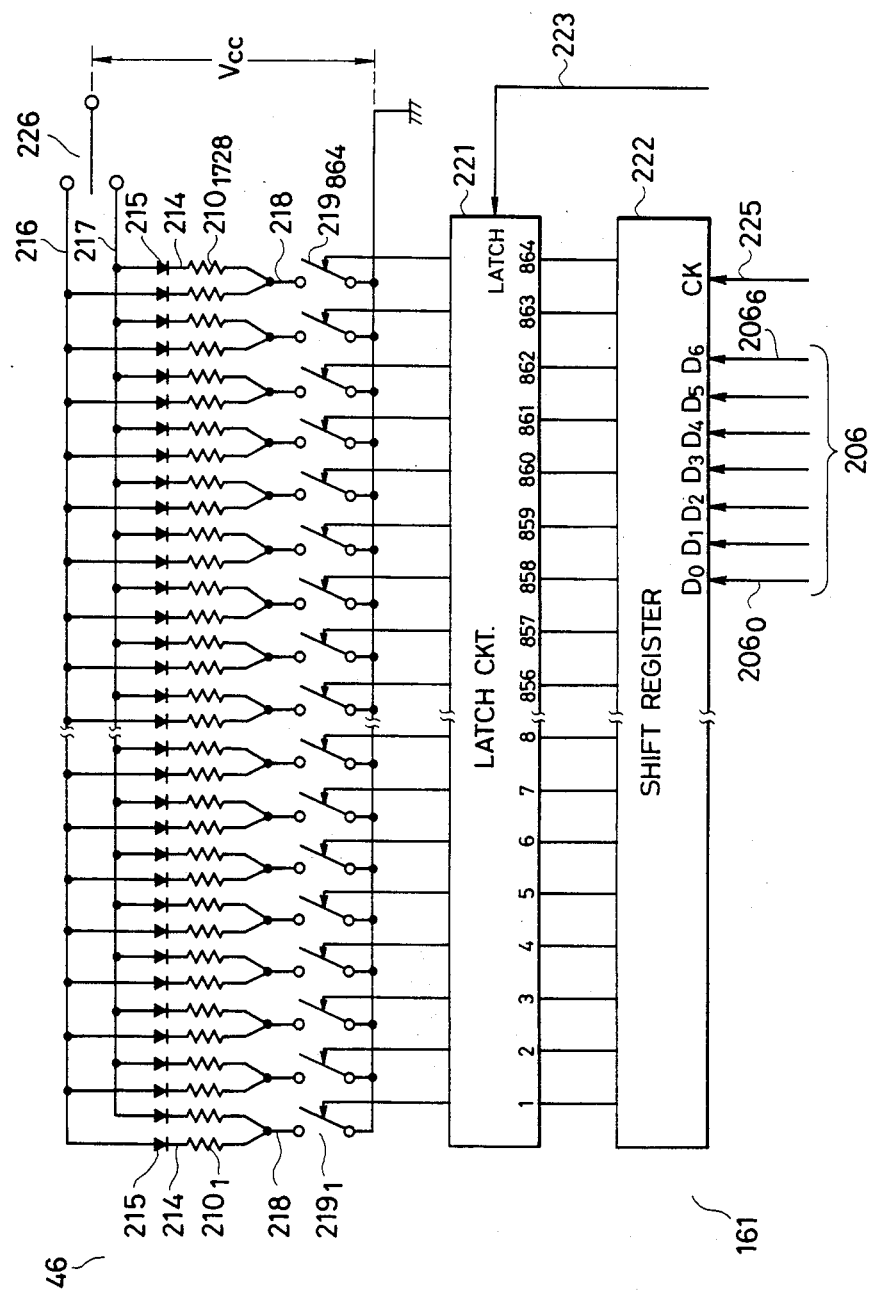
FIG. 28 is a block diagram of a thermal head and its thermal head driver.

FIG. 28 shows the line-type thermal head and the thermal head driver mounted thereon. The thermal head 46 in this embodiment has 1728 unit heating bodies $210_1$ through $210_{1728}$ for printing data at a recording density of 8 dots/mm on a recording sheet of A4 size (having a width of 216 mm). These unit heating bodies are fabricated by dividing a single elongated heating resistance body with a number of electrodes 214 which are connected by diodes 215 alternately to two common electrodes 216, 217. The unit heating bodies are combined into pairs $210_{2n+1}$, $210_{2n+2}$ (n =0 through 863), each pair of unit heating bodies being coupled to an electrode 218 for controlling a current passing through it. The electrodes 218 are connected to switching elements $219_1$ through $219_{864}$ in the thermal head driver 161 which have terminals grounded. The 864 switching elements $219_1$ through $219_{864}$ are individually turned on and off by latched outputs from a latch circuit 221 in the thermal head driver 161. The latch circuit 221 latches 864 parallel data from a shift register 222 with a latch signal 223.

More specifically, when the serial transfer data 206 are supplied to data input terminals $D_0$ through $D_6$ of the shift register 222, these data are set in the shift register 222 in synchronism with a clock signal 225. The 836 parallel data converted by the shift register 222 are latched in the latch circuit 221 by the latch signal 223 and held therein until a next latch signal is applied. In the positions where the latch output is a signal "1", the switching elements 219, which may comprise transistors, are turned on to allow a voltage Vcc from the common electrode 216 or 217 selected by a switch circuit 226 to be applied to the corresponding unit heating bodies 210 which generate heat. In the positions where the latch output is a signal "0," the switching elements 219 are turned off and the corresponding heating bodies 210 do not generate heat. The data can thus be printed by the selectively heated unit heating bodies 210.

The latch signal 223 is generated at the period of 0.05 msec. in the thermal head driver 161. Each time the latch signal 223 is generated, the content of the shift register 222 is changed to energize the unit heating bodies for a time corresponding to the applied pulse duration TiB. After the 864 unit heating bodies are controlled in the above manner, the switch circuit 226 selects the other common electrode 216 or 217, and the same operation as above is repeated. When all of the 1728 unit heating bodies $210_1$ through $210_{1728}$ have been controlled, the printing of one line is completed. In the illustrated embodiment, one-line printing operation is performed in cycles each of 5 msec.

Generation of Transfer Data and the Like

Figures 29, 30:
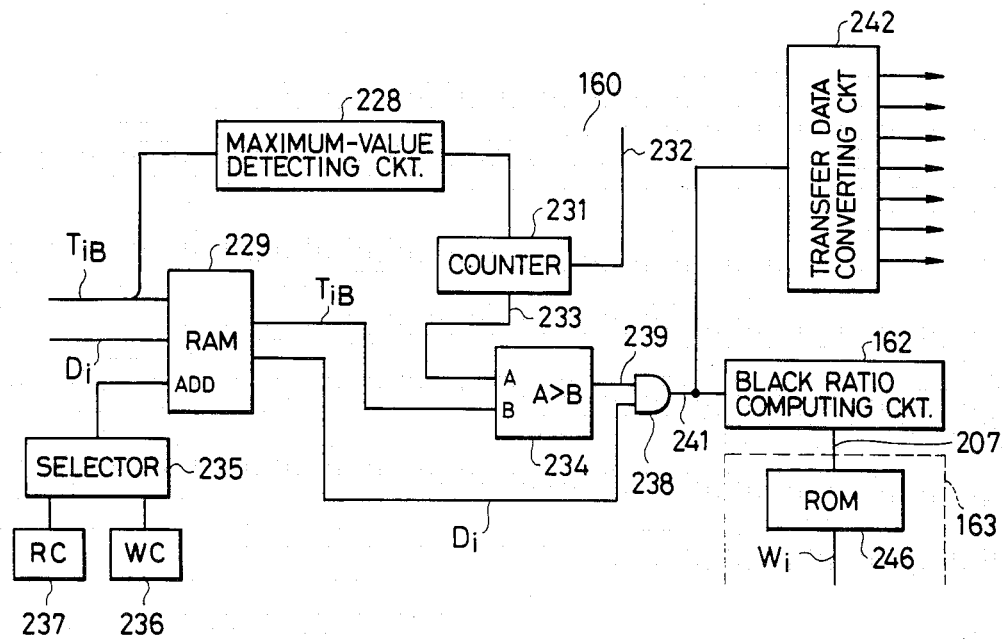
FIG. 29 is a block diagram of an arrangement for converting printing energy information into transfer data.
FIG. 30 is a diagram showing the arrangement of printing data.

FIG. 29 shows a circuit arrangement for generating the transfer data and the like based on the applied pulse duration TiB. The applied pulse duration TiB, corresponding to the period in which the thermal head driver 161 selects the common electrode 216 or 217 and effects printing, is supplied as 5-bit parallel data to a maximum-value detecting circuit 228 and a RAM 229 successively for the 864 unit heating bodies. The maximum-value detecting circuit 228 determines a maximum time duration $T_{MAX}$ of pulses applied to these 864 unit heating bodies. The determined maximum time duration $T_{MAX}$ is then transferred to a counter 231. The counter 231 counts up the supplied value with a counter clock 232 and issues count data 233 which is supplied to a comparison input terminal A of a comparator circuit 234.

While the RAM 229 is being supplied with data concerning the applied pulse duration Ti3, a selector 235 selects a writing address counter 236 to write the applied pulse duration TiB and the data Di of interest to be printed at a corresponding address. At this time, a signal "1" is written for the data Di of interest which is printed, and a signal "0" is written for the data Di of interest which is not printed, regardless of the tone level. After one line of data has been written, and at the time the counter 231 issues the first count "1" as the count data 233, the selector 235 selects a reading address counter 237 to read the applied pulse duration TiB and printing data (data of interest) Di' indicative of either printing or nonprinting out of the RAM 229. The applied pulse duration TiB is supplied to another comparison input terminal B of the comparator circuit 234, while the printing data Di' is supplied to one input terminal of an AND gate 238. The comparator circuit 234 compares, dot by dot, the count data 233 which is "1" (in decimal notation) and the applied pulse duration TiB. When the applied pulse duration TiB is equal to or greater than the count data 233, the comparator circuit 234 issues a signal "1" as a comparator output 239. In this signal processing procedure, therefore, when the printing energy is greater than a quantity corresponding to one unit pulse of 0.05 msec, the signal "1" is issued and printing is effected with respect to the data Di of interest. The "0" is issued when the printing energy is smaller than that quantity.

The comparator output 239 and the printing data Di' are ANDed by the AND gate 238 since the applied pulse duration Ti is a value computed irrespective of whether the data of interest is printed or not, and it is necessary to change the comparator 239 to the signal "0" (nonprinting) even when it is the signal "1" (printing). Therefore, printing data 241 issued from the AND gate 238 and corresponding to the 864 dots are a data series indicative of whether these dots are to be printed or not in the first 0.05 msec. The unit printing data 241 are supplied to both a thermal-head transfer data converting circuit 242 and the black-ratio computing circuit 162.

Thereafter, the counter 231 counts 1 and the count data 233 becomes "2." In this condition, the RAM 229 repeats the reading of the applied pulse duration TiB and the printing data Di', and the AND gate 238 issues a data series in a second 0.05 msec. as the printing data 241. Subsequently, the data Di of interest are rearranged as printing data for every 0.05 msec. while one of the common electrodes 216, 217 (FIG. 28) is selected. FIG. 30 shows an arrangement of one-unit series of 864 data of the printing data thus rearranged. The upper row indicates numbers of the unit heating bodies 210, and the lower row data representing whether printing is effected or not.

Figures 31, 32:
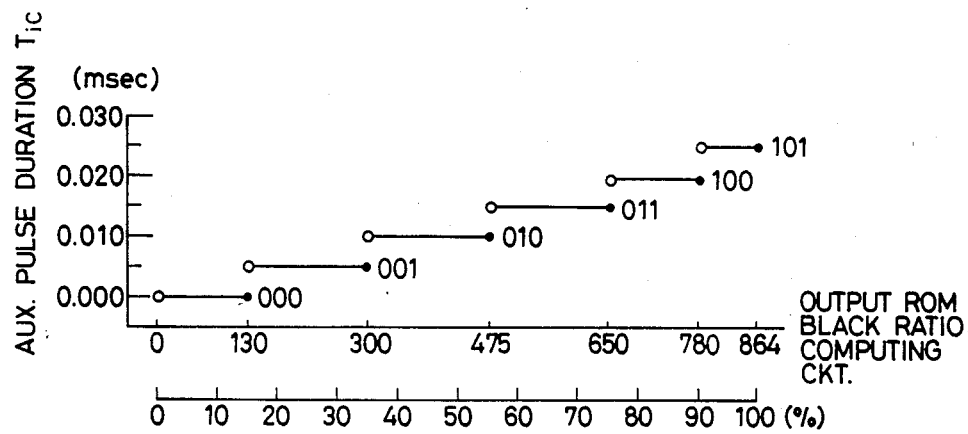
FIG. 31 is a diagram showing the arrangement of printing data series grouped by a transfer data converting circuit.
FIG. 32 is a diagram of data stored in the ROM for computing an auxiliary pulse width.

The transfer data coverting circuit 242 reads the serially transmitted printing data 241 in synchronism with a clock (not shown), and converts the data 241 into seven groups each composed of 128 dots. More specifically, as shown in FIG. 31, the 1st through 128th data are classified as the 0th group and supplied as transfer data $206_0$ to the data input terminal $D_0$ of the shift register 222. The 129th through 256th data are classified as the 1st group and supplied as transfer data $206_1$ to the data input terminal $D_1$ of the shift register 222. The remaining data are similarly processed and supplied. However, the amount of data to be processed in the 6th group is the remainder smaller than the amount of each of the other groups. These transfer data $206_0$ through $206_6$ supplied to the shift register 222 are set as 864 data therein and used for controlling the printing of the unit heating bodies.

The unit printing data 241 supplied to the black-ratio computing circuit 162 are counted for the number of dots which effect printing. The count ranges from "0" to "864." The count data 207 indicative of the count serves as addressing information for a ROM 246 in the corrected-pulse-duration computing circuit 163.

FIG. 32 shows the content of the ROM 246. The higher the black ratio in one printing operation, the longer the auxiliary pulse duration TiC. The auxiliary pulse duration TiC is a pulse duration added to the unit pulse of 0.05 msec. and can be set up to a maximum of 0.025 msec. in steps of 0.005 msec. It has been described above that the applied pulse duration TiB is issued as the number of unit pulses of 0.05 msec. An auxiliary pulse having a time duration corresponding to the black ratio is added to this unit pulse for actual printing. The higher the black ratio, the longer the auxiliary pulse duration TiC because of compensation for a reduction in the printing energy due, for example, to a drop of the power supply voltage Vcc (FIG. 28). The auxiliary pulses which vary in the steps of 0.005 msec. are successively issued with the number of them indicative of 3-bit black-ratio information Wi.

In the thermal head driving device described above, it is possible to produce a maximum applied pulse duration TiB of 1.2 msec. for one dot, as well as a maximum auxiliary pulse of 0.025 msec for each of the up to 24 unit pulses at 0.05 msec. Accordingly, the maximum time for energization per dot is 1.8 msec., and the maximum time for printing one line through switching of the two common electrodes 216, 217 is doubled, i.e., 3.6 msec. This maximum time is shorter than the one-line printing cycle which is 5 msec. and does not practically present any problem.

Figure 33:
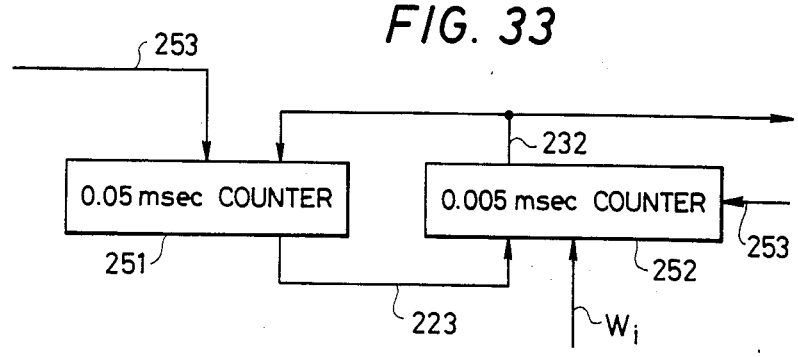
FIG. 33 is a block diagram of a circuit arrangement for setting the time duration of an applied pulse.

FIG. 33 shows two counters in the corrected-pulse duration computing circuit 163. A 0.05-msec.counter 251 serves to set unit pulses, and a 0.005-msec.counter 252 serves to set auxiliary pulses. The 0.05-msec.counter 251 frequency-divides a basic clock 253 to count the time duration of 0.05 msec. When 0.05 msec. is elapsed, the counter 251 issues a count end signal 223. At this time, the 0.005-msec. counter 252 reads the black-ratio information Wi from the ROM 246. The 0.005-msec. counter 252 counts the time duration of 0.005 msec. for a number given by the black-ratio information Wi, and issues a counter clock 232 when the counting is completed. The counter clock 232 is applied to the 0.05-msec. counter 251 for starting counting a next time duration of 0.5 sec. The counter clock 232 is also supplied to the counter 231 shown in FIG. 29.

Figure 34:
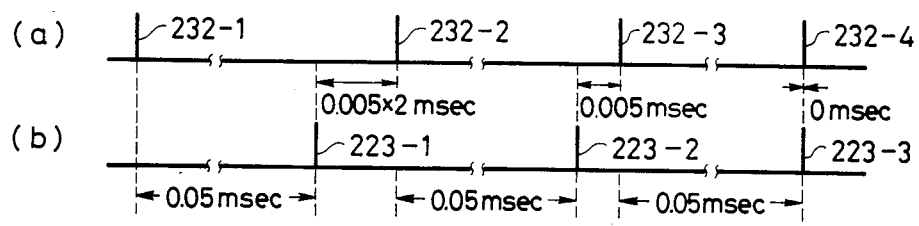
FIG. 34 is a timing diagram explanatory of operation of the circuit arrangement shown in FIG. 33.

FIG. 34 shows by way of example the setting of applied pulses at the time the black-ratio information Wi changes successively from "010" to "001" to "000." At the same time that a counter clock 232-1 is generated as shown in FIG. 34(a), a unit pulse is counted. Upon elapse of 0.05 msec. a count end signal 223-1 is generated as shown in FIG. 34(b). At this time, the black-ratio information Wi indicating the numeral value "2" is read into the 0.005-msec. counter 252. As a consequence, the 0.005-msec. counter 252 issues a counter clock 232-2 upon elapse of 0.01 msec. The total time 0.06 msec. which has elapsed thus far is the first printing pulse duration.

Likewise, the second printing pulse duration is 0.055 msec. which is the sum of 0.05 msec. from the generation of the counter clock 232-2 to the generation of a count end signal 223-2, and 0.005 msec. from the generation of the count end signal 223-2 to the generation of a next counter clock 232-3. The third printing pulse duration is 0.05 msec. since the duration of the auxiliary pulse is nil. The printing energy is thus controlled. The count end signal 223 is also used as the latch signal 223 shown in FIG. 28.

Example of Printing Operation

Figure 35:
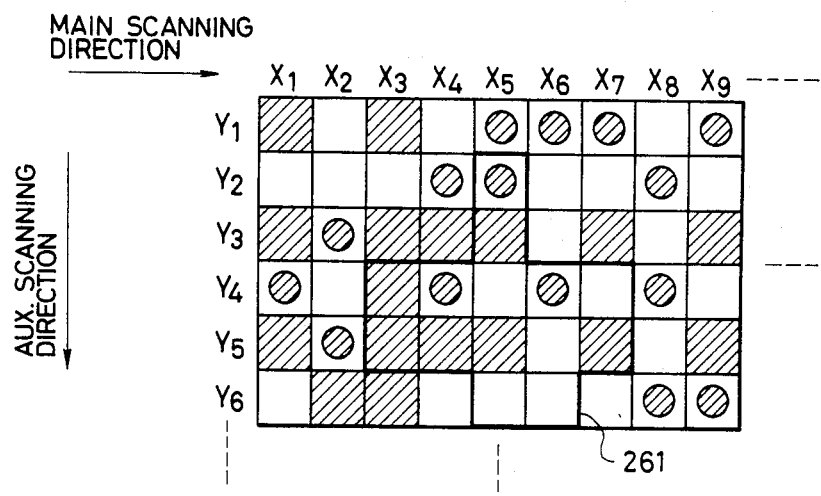
FIG. 35 is a diagram of an arrangement of image data.

Operation of the components of the thermal head driving device have been described. Finally, one example of overall operation will be described. It is now assumed that there are image data as illustrated in FIG. 35. Hatched squares indicate image data of the tone level "2", while hatched circles indicate image data of the tone level "1". These data are represented by coordinates $X_1$, $X_2$ in the main scanning direction and coordinates $Y_1$, $Y_2$ in the auxiliary scanning direction. The coordinate Xl indicates a position for starting the scanning along lines, and the coordinates $Y_1$, $Y_3$, $Y_5$, ... indicate odd-numbered scanning lines. It is assumed that when the data of interest is positioned at the coordinates $(X_5, Y_5)$, the substrate temperature of the substrate is 25° C. and the resistance of the unit heating body for printing the data of interest is 590 ohms.

(i) First, the thermal storage level $X_i$ is computed from a reference data group in a frame 261 shown in FIG. 35. From FIGS. 18 and 19, the sum $x_i$ of the reference data is given as follows:

$$x_i = 12 + 70 + 10 + 20 + 20 + 30 + 70 + 30$$
$$= 332$$

Therefore, the thermal storage level $X_i$ is "7" from FIG. 17.

(ii) The identification of a tone pattern will now be described. The four image data which constitute a 2×2 dot matrix correspond to the following four coordinates:

$(X_5, Y_5), (X_6, Y_5),$ $(X_5, Y_6), (X_6, Y_6)$

The tone discriminating circuit 155 issues tone pattern data $G_m$ which represents the tone pattern 3 with the above coordinates.

(iii) The pulse-duration computing circuit 154 determines the applied pulse duration $T_{iA}$ from the thermal storage level $X_i$, the tone pattern data $G_m$, and the data $D_i$ of interest. Since the data $D_i$ of interest corresponds to an output dot of the tone level "2," FIG. 22 is applied and the applied pulse duration $T_{iA}$ is 0.86 msec.

(iv) The applied pulse duration $T_{iA}$ is corrected by the pulse-duration correcting circuit 159 to produce the applied pulse duration $T_{iB}$. Inasmuch as the substrate temperature is 25° C., the substrate temperature data $B_i$ is "010" from the Table 3. Since the resistance of the unit heating body is 590 ohms, the resistance data $R_i$ is "001" from the Table 2. Therefore, from FIG. 27, the applied pulse duration $T_{iB}$ is 0.70 msec., and the data of interest is printed by repeating the unit pulse of 0.05 msec.

Figure 36:
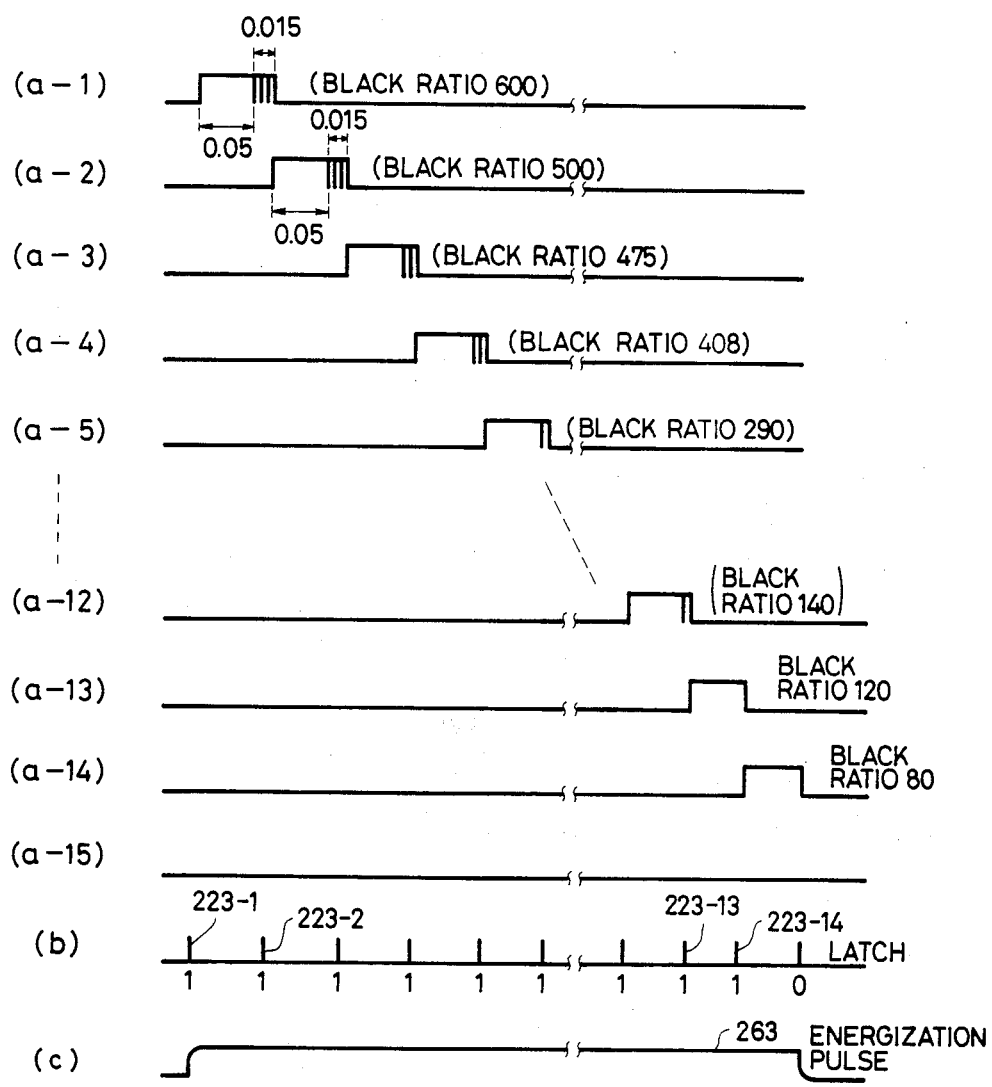
FIG. 36 is a diagram illustrative of various waveforms showing printing operations of the thermal head driver device.

FIG. 36 shows 15 printing cycles in the line in which the data of interest is printed. When the data of interest is printed, one of the two common electrodes 216, 217 (FIG. 28) which corresponds to the data of interest is connected to the power supply.

A first unit pulse is generated for 0.05 msec., as shown in FIG. 36(*a*-1), by a first latch signal 223-1, illustrated in FIG. 36(*b*), while an energization pulse 263 rises, as shown in FIG. 36(*c*). If the count of the black ratio is 600b in the first cycle, the auxiliary pulse becomes 0.005 msec.×3, and the applied pulse is increased in duration by 0.015 msec. The count data 233 of the counter 231 (FIG. 29) is "1".

When the first printing cycle is finished, a second latch signal 223-2 is generated to latch next data in the latch circuit 221. Simultaneously, a unit pulse of 0.05 msec. is generated as shown in FIG. 36(*a*-2). If the black-ratio count is 500 at this time, the printing pulse is again increased in duration by 0.015 msec. The count data 233 of the counter 231 is "2." Since the printing pulses in the first and next cycles are continuous without interruption, the energization pulse 263 is continuously applied.

Likewise, the count data 233 of the counter 231 is counted up one by one to enable the printing operation to process (FIG. 36(*a*-3) through (*a*-14). As the printing operation advances, the black ratio is progressively reduced since the lower the printing energy of a unit heating body, the faster the application of a pulse by that unit heating body is completed. With respect to the data of interest as shown in FIG. 35, the transfer data is a signal "1" from the first to the fourteenth cycles, and is a signal "0" in the subsequent cycles.

For thermal storage correction of the thermal head 46, it is necessary to keep the temperature of the substrate in a prescribed temperature range. Although not shown, heat radiating plates such as fins are attached to the substrate of the thermal head 46, and a motor fan is positioned in the vicinity of the heat radiating plates. A thermistor (not shown) is also attached to the substrate of the thermal head 46 for measuring the temperature thereof. The sequence controller 91 rotates the fan to cool the substrate of the thermal head 46 when its temperature increases beyond a given temperature.

While the applied energy in the thermal head driving device described above is set with reference to the thermal storage data and resistance data of the unit heating bodies, it is also possible to set the applied energy according to image data on a line to be printed after the line to which the data of interest belongs and according to other image data on the line to which the data of interest belongs. This is done to improve the printing in a solid region or in a boundary between the solid region and the background.

While the thermal head driving device has been described with respect to the 2×2 dot matrix, the thermal head driving device can be applied to an output dot combination of other matrix constructions or to an output dot combination having no matrix construction.

Although the heating resistance bodies of the thermal head 46 are divided into two blocks for successive printing in the described embodiment of the thermal head driving device, the heating resistance bodies may be divided into more than two blocks, e.g., four blocks for successive printing in order to make the power supply more compact. Where the ratio of black information in one line to be recorded is large, such as more than 25%, the heating resistance bodies may be divided into eight or sixteen blocks for successive printing. With this arrangement, the power supply capacity need not be larger even if the ratio of black information is high. Where the number of divided blocks is varied, the time required for recording one line is changed, and hence the sequence controller 91 is required to control the driving of the scanner motor 7 depending on the varied time for recording one line.

Feeding of Recording Sheet and Recording Operation

When one of the start buttons 70 through 72 (FIG. 2) is depressed and there is no malfunction in the copying machine, the sequence controller 91 supplies a drive signal to a sheet feed motor driving circuit 271 and a clutch driving circuit 272 (FIG. 3) to drive the sheet feed motor 26 and the electromagnetic clutch 29 (FIG. 1). The feed roller 23 is rotated to start feeding a recording sheet 22 from the sheet cassette 21. The recording sheet 22 fed from the sheet cassette 21 is located in position with its leading end engaged and stopped by the pair of register rollers 24.

Upon elapse of a given period of time after the recording sheet 22 has started being fed, the sequence controller 91 supplies a drive signal to a clutch driving circuit 273 to drive the electromagnetic clutch 31 for the register rollers 24, which are then rotated to resume the feeding of the recording sheet 22. When the leading end of the recording sheet 22 passes between the register rollers 24, it is detected by the register sensor 25. Then, the sequence controller 91 de-energizes the electromagnetic clutch 29 for the feed roller 23 to stop the rotation of the feed roller 23. Thereafter, the recording sheet 22 is fed along by the register rollers 24.

From the command to start feeding the recording sheet 22 from the sheet cassette 21, the sequence controller 91 starts measuring time. If the register sensor 25 does not detect the leading end of the recording sheet 22 within a predetermined period of time, the sequence controller 91 determines that a feed error of paper jam has occurred, and stops the scanner motor 7 and the sheet feed motor 26. Simultaneously, the sequence controller 91 delivers a signal to the control panel 61 to cause the trouble indicator 69 to flicker. The sequence controller 91 effects the same process as above when the trailing end of the recording sheet 22 is not detected upon rotation of the register rollers 24 through a certain angular interval after the register sensor 25 has detected the leading end of the recording sheet 24.

When the register sensor 25 detects the leading end of the recording sheet 24, the sequence controller 91 begins counting drive pulses supplied from the sheet feed motor driving circuit 271 to the sheet feed motor 26. When the leading end of the recording sheet 22 reaches a position just in front of the heating resistance bodies of the thermal head 46, the sequence controller 91 supplies a drive signal to a step motor driving circuit 274 to energize the step motor 51. The drive roller 48 and the takeup roll 50 are rotated, whereupon the ink donor sheet 42 starts being fed along. The ink donor sheet 42 is fed in the above mode so as to avoid unwanted consumption of the ink donor sheet 42. The guide roller 45 should be positioned for smoothly feeding the recording sheet 22, in superposed relation to the ink donor sheet 42, to the back roller 47.

As the ink donor sheet 42 starts being fed along, the recording sheet 22 passes between the thermal head 46 and the back roller 47 while being sandwiched between the ink donor sheet 42 and the back roller 47. The ink donor sheet is composed of base paper coated on one side with a thermally flowable or sublimable black ink, as described above. The black ink, which is fluidized or sublimed when the unit heating bodies of the thermal head 46 are selectively heated by the image signal, is transferred to the recording sheet 22 for thermal transfer recording. The speed with which the recording sheet is fed per scanning line on the ink donor sheet 42 delivered by the driver roller 48, varies depending on the copying magnification selected on the control panel 61. The ratios of the available intervals are 75%:100%:125% 3:4:5.

The ink donor sheet 42 has a width of about 310 mm which is about 10 mm longer than the maximum width (297 mm in the A3 size) of the recording sheet 22 used in this copying machine. The recording sheet 22 is superposed on the ink donor sheet 42 centrally in the transverse direction thereof. Therefore, even if one or both of the recording sheet and ink donor sheet feeding systems were not mechanically accurate and caused one or both of the recording sheet 22 and the ink donor sheet 42 to be skewed, the recording sheet 22 would not be displaced beyond the edges of the ink donor sheet 42. Accordingly, no recording failures will be caused, and no black lines will be drawn on the recording sheet 22 by the edges of the ink donor sheet 42.

The recording sheet 22 on which the image has been recorded passes between the back roller 47 and the drive roller 48 in superposed relation to the ink donor sheet 42. Thereafter, the ink donor sheet 42 changes its direction of travel through a sharp angle and is wound by the takeup roll 50 on which a prescribed force is imposed by the slip clutch 53. The recording sheet 22 does not follow the direction of travel of the ink donor sheet 42, but is peeled off the ink donor sheet 42 due to its own rigidity. The peeled recording sheet 22 is guided by a guide plate 275 to be discharged onto a discharge tray 276.

Detection and Handling of Paper Jam

In the vicinity of the guide plate 275, there is disposed a jam sensor 277 (FIG. 3) composed of a photosensor for detecting the recording sheet. The sequence controller 91 checks the output from the jam sensor 277 to ascertain (1) whether the recording sheet 22 is detected at a prescribed timing, and (2) whether the detected recording sheet 22 passes within a prescribed period of time. If (1) the leading end of the recording sheet 22 is not detected by the prescribed time or (2) the trailing end of the recording sheet 22 upon elapse of the prescribed period of time after the leading end has been detected is not detected, the sequence controller 91 determines that the recording sheet 22 is jammed, and stops the operation of the recording assembly 41. At the same time, the sequence controller 91 delivers a signal to the control panel 61 to cause the trouble indicator 69 to flicker. If a paper jam is detected by the jam sensor 277, the user operates a jam removal lever (not shown) located in the recording assembly 41 to open the space between the thermal head 46 and the back roller 47 for easy removal of the recording sheet 22 which has been jammed.

Handling of Ink Donor Sheet

As shown in FIG. 1, the copying machine has an ink donor sheet sensor 278 in confronting relation to the automatic balancing roller 44. The ink donor sheet sensor 278 is composed of a light-emitting element and a photodetector for issuing a signal of an analog level representative of the amount of light reflected from the surface of the ink donor sheet 42. The sequence controller 91 is responsive to the detected signal from the ink donor sheet sensor 278 for ascertaining whether the color of the transfer ink coated on the ink donor sheet 42 is other than black, e.g., red or white. If the color of the transfer ink on the ink donor sheet 42 is red, the sequence controller 91 energizes the color indicator 83 to let the user know that the color of the ink of the ink donor sheet 42 is red (i.e., other than black).

Figure 37:
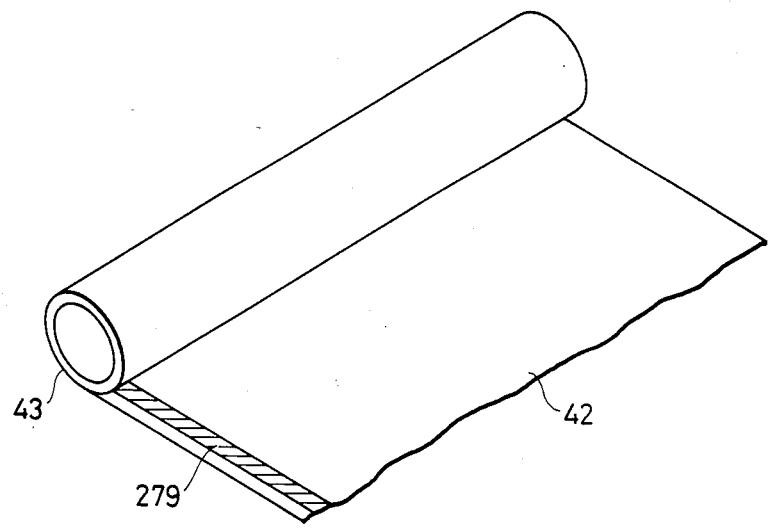
FIG. 37 is a perspective view of the detection of a final end of an ink donor sheet.

As shown in FIG. 37, the ink donor sheet 42 wound on the supply roll 43 has an end mark 279 on a side thereof, the end mark 279 extending from a position near the trailing end to the trailing end. The end mark 279 may be composed of a strip of white ink coated on the ink side of the ink donor sheet 42, or may be in the form of an ink-free strip where the ink is removed from the base paper by a suitable heating means. When the ink donor sheet sensor 278 detects the end mark 279, the sequence controller 91 energizes the end indicator 84 to let the user know that the remaining length of the ink donor sheet 42 is short. Since the end mark 279 is of a length which covers several copies, the user may replace the ink donor sheet 42 with a new one when replacing the original. The housing 1 of the copying machine has an upper portion 1A openable upwardly with respect to a lower portion 1B thereof. Therefore, by opening the upper portion 1A, the user can easily change the ink donor sheet 42 from above the lower portion 1B. The thermal head 46 may be arranged such that when the upper portion 1A is opened, the thermal head 46 is angularly moved upward through a relatively large angle to allow easy removal of the recording sheet which is jammed.

Figure 38:
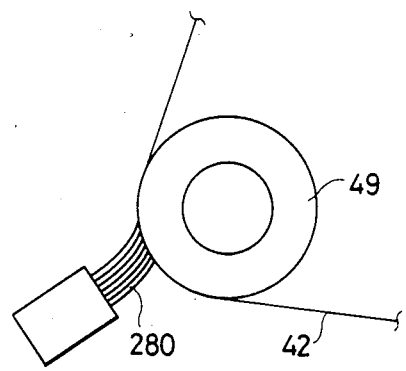
FIG. 38 is a schematic diagram showing the manner in which the ink donor sheet is discharged.

The ink donor sheet 42 can easily be charged when it is fed since it has solid ink coated on a base paper such as condenser paper. Therefore, the copying machine has a conductive brush 280 (FIGS. 1 and 38) in confronting relation to the guide roller 49 and having a length equal to the width of the ink donor sheet 42 for removing the charges from the ink donor sheet 42.

Automatic Balancing Roller

If the ink donor sheet 42, were skewed after it was unreeled from the supply roll 43 and prior to introduction between the thermal head 46 and the back roller 47, the ink donor sheet 42 would undulate in the direction of travel and wrinkle in contact with the thermal head 46 and the back roller 47. This would cause ink transfer failure at the wrinkles. This problem can be eliminated by the automatic balancing roller 44.

Figure 39:
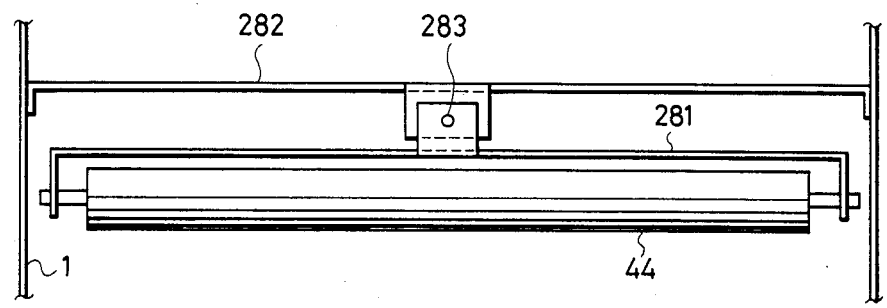
FIG. 39 is a view of an automatic balancing roller for removing wrinkles from the ink donor sheet.

FIG. 39 shows the automatic balancing roller 44 in detail. The automatic balancing roller 44 has its opposite ends rotatably supported on opposite sides of a support plate 281. The support plate 281 has its central portion pivotally mounted by a shaft 283 on the central portion of an attachment plate 282 fixed to the copying machine housing 1. The automatic balancing roller 44 has its axis extending perpendicularly to the shaft 283.

Figure 40:
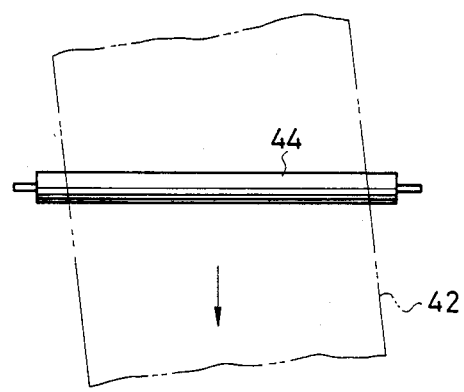
FIG. 40 is a view showing the operation of the automatic balancing roller.

When the ink donor sheet 42, unwound from the supply roll 43, is skewed with respect to the direction of travel indicated by the arrow in FIG. 40, the tension on lefthand edge (as seen in FIG. 39) of the ink donor sheet 42 is reduced, and the tension on the righthand edge is increased. Therefore, the automatic balancing roller 44 is turned clockwise in FIG. 39 to increase the tension on the lefthand edge (as seen in FIG. 40) of the ink donor sheet 42 and reduce the tension on the righthand edge thereby making the tension on the ink donor sheet 42 more uniform. The ink donor sheet 42 is thus prevented from being skewed and is fed normally toward the thermal head 46. When the skew of the ink donor sheet 42 is removed, the edges thereof are equally tensioned and hence the automatic balancing roller 44 returns to the original horizontal position.

Relationship to External Device

While in the illustrated embodiment the copying machine is described mainly with respect to the copying operation, it can send and receive images to and from an external device since the copying machine has the means for reading and recording image information. With the use of an external image processing device, it is possible to process an image by combining images, deleting a portion of an image, or moving an image, and afterwhich the processed image may be entered for producing a recorded image. Optical communication means such as an optical fiber is effective in transmitting a large amount of image information between the copying machine and the external device.

Some modes of use of the copying machine will be described by way of illustrative example.

First, the copying machine can produce copies as described above. Of the four mode indicators on the control panel 61, only the copy indicator 77 is lighted during the copying mode to indicate that the copying machine is in the copying mode.

Second, the copying machine can be used as a facsimile transmitter or receiver. When the copying machine is used as a facsimile transmitter, the transmitting button 81 on the control panel 61 is depressed to energize the transmission indicator 79 and indicate that the copying machine is in the transmitting mode. Then, an original is placed on the platen 2 and one of the start buttons 70 through 72 is depressed to supply the serial image signal 107, issued from the image signal processing circuit 98 through the interface controller 110, to an external facsimile receiver. At this time, any recording in the recording assembly 41 is inhibited, and no recording sheet is fed from the sheet cassette 21.

When the copying machine is used as a facsimile receiver, a serial image signal is supplied from an external facsimile transmitter through the interface controller 110 to the image signal reproducing circuit 109. At this time, only the reception indicator 78 is energized to indicate that the copying machine is in the reception mode. Then, a recording sheet 22 is fed from the sheet cassette 21 and the image is recorded on the recording sheet by the recording assembly 41 in the same manner as the copying mode.

Finally, the copying machine can be used as a facsimile transmitter while producing copies. In this mode, the transmitting/copying button 82 is pressed to light only the transmission/copy indicator 80 to indicate that the copying machine is in the transmitting/copying mode. An original is then placed on the platen 2, and one of the start buttons 70 through 72 is depressed. The serial image signal 107 issued from the image signal processing circuit 98 is supplied to the image signal reproducing circuit 109 and also to an external facsimile receiver via the interface controller 110.

Modification 1 of the First Embodiment

In the foregoing copying machine, the scanning directions on the forward and return strokes of the scanner unit 4 are opposite to each other, and hence the images on the odd-numbered and even-numbered recording sheets 22 disposed onto the discharge tray 276 are opposite to each other, making any subsequent processing troublesome.

Figure 41:
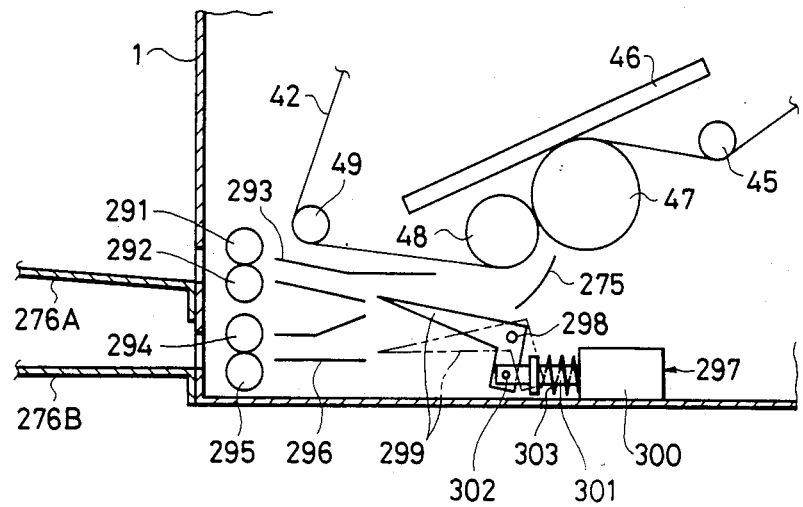
FIG. 41 is a view of a first modification of the copying machine of this invention.

FIG. 41 shows an arrangement in a modified copying machine for solving the above problem. Those parts in FIG. 41 which are identical to those in FIG. 1 are denoted by identical reference characters and will not be described in detail.

Upper and lower discharge trays 276A, 276B are attached to an outer surface of the housing 1 of the copying machine. Housing 1 contains a discharge roller 291 in front of the upper discharge tray 276A and a pinch roller 292 held in rolling contact with the discharge roller 291. A recording sheet guide 293 is disposed in front of the rollers 291, 292. Housing 1 also contains a discharge roller 294 in front of the lower discharge tray 276B and a pinch roller 295 held in rolling contact with the discharge roller 294. A recording sheet guide 296 is disposed in front of the rollers 294, 295. A direction switching mechanism 297 is positioned in front of the recording sheet guides 293, 296 for changing the direction in which the recording sheets are discharged. The direction switching mechanism 297 has a substantially L-shaped switching lever 299 pivotally mounted on a fixed pin 298. The switching lever 299 is pivotally coupled by a pin 302 to a plunger 301 of a plunger solenoid 300.

When the plunger solenoid 300 is de-energized, the switching lever 299 is directed in alignment with the upper recording sheet guide 293 as indicated by the solid lines in FIG. 41. Therefore, the recording sheet 22 peeled off the ink donor sheet 42 is fed along a recording sheet guide 275, the switching lever 299, and the recording sheet guide 293, and then discharged between the discharge roller 291 and the pinch roller 292 onto the upper discharge tray 276A.

When the plunger solenoid 300 is energized to pull the plunger 301 against the force of a spring 303, the switch lever 299 is directed into alignment with the lower recording sheet guide 296 as indicated by the broken lines in FIG. 41. The recording sheet 22 peeled off the ink donor sheet 42 is then fed along the recording sheet guide 275, the switching lever 299, and the recording sheet guide 296, and then discharged between the discharge roller 294 and the pinch roller 295 onto the upper discharge tray 276B.

When a plurality of copies are to be produced from one original in the copying machine of FIG. 41, the image information of the original is read by the scanner unit 4 on its forward and return strokes, and images are recorded on recording sheets 22. At the same time, the sequence controller 91 controls the operation of the plunger solenoid 300 depending on the recording sheets 22. More specifically, when the odd-numbered recording sheets 22 are to be discharged, the plunger solenoid 300 is de-energized, and when the even-numbered recording sheets 22 are to be discharged, the plunger solenoid 300 is energized. As a result, the odd-numbered recording sheets 22 are discharged onto the upper discharge tray 276A with the recorded images oriented in the same direction, and the even-numbered recording sheets 22 are discharged onto the lower discharge tray 276B with the recorded images oriented in the same direction. Thus, the discharged recording sheets 22 with the recorded images can easily be processed at a later time.

For producing a single copy of each of plural originals in the copying machine, the plunger solenoid 300 remains de-energized. All recording sheets 22 are therefore discharged onto the upper discharge tray 276A with the recorded images oriented in the same direction.

Modification 2 of the First Embodiment

Some originals to be copied bear an image in red and an image in black on the same sheet. When such an original is to be copied, the user may want to read only the image information in black or red and produce a recorded image in one color. For recording the image in black, an ink donor sheet 42 coated with black ink is used. For recording the image in red, an ink donor sheet 42 coated with red ink is used. It is also necessary to ascertain whether the image information read is in black or red. An arrangement for meeting the above requirement will be described below.

Figure 42:
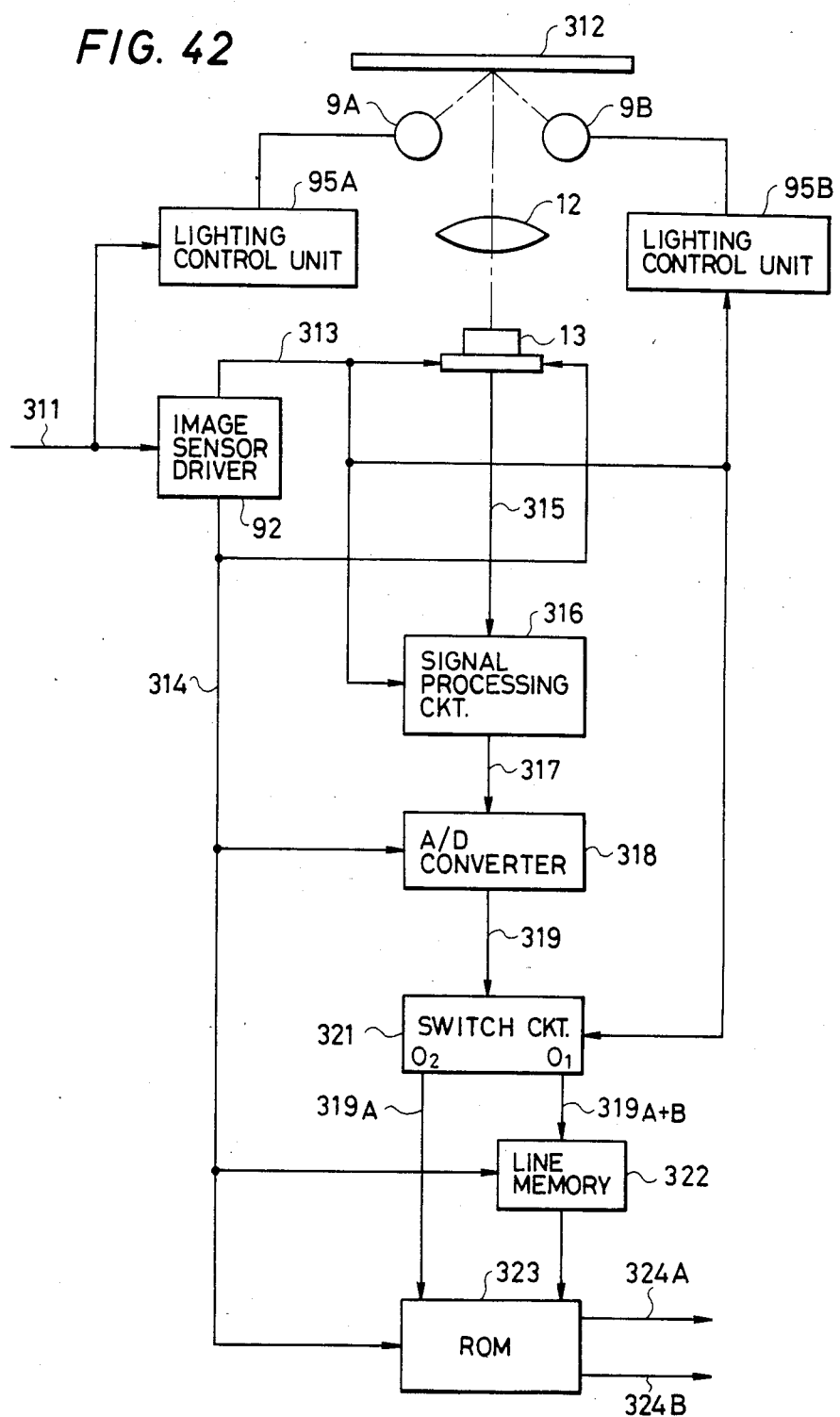
FIG. 42 is a block diagram of a circuit arrangement for reading an image and color separation in a second modification of the copying machine of this invention.
Figure 44:
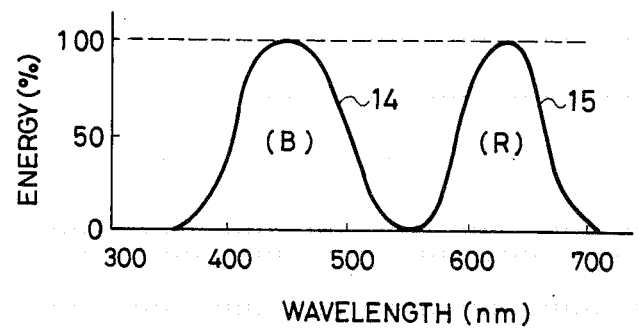
Figure 46:
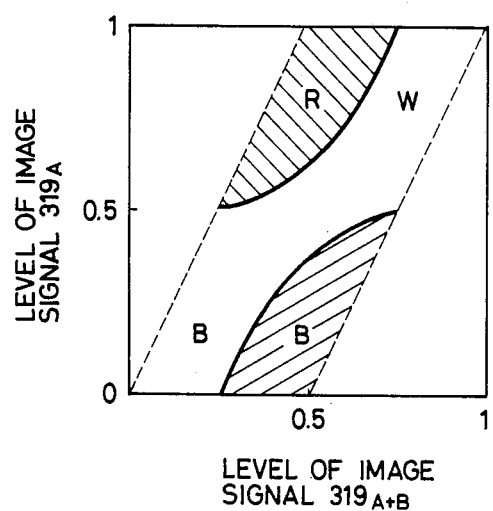
Figure 45:
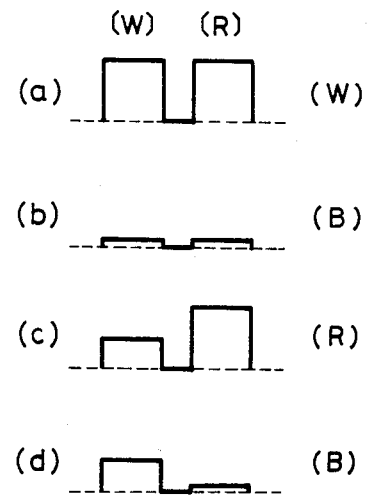

FIG. 42 shows a circuit arrangement for reading image information and effecting color separation. The scanner unit has a red fluorescent lamp 9A and a blue fluorescent lamp 9B.

A lighting control unit 95A for controlling the energization of the red fluorescent lamp 9A is supplied with a drive signal 311. When an original 312 is read, the drive signal 311 is rendered active during the entire scanning period to energize the red fluorescent lamp 9A. Another lighting control unit 95B serves to control the energization of the blue fluorescent lamp 9B. The lighting control unit 95B is supplied with a scanning start signal 313 from the image sensor driver 92 which is started to operate by the drive signal 311. The scanning start signal 313 serves to start each scanning operation. Each time the scanning start signal 313 is applied, the lighting control unit 95B energizes or de-energizes the blue fluorescent lamp 9B. Therefore, the red fluorescent lamp 9A continues to be lighted while the original 312 is being read, and the blue fluorescent lamp 9B is switched on or off in each scanning operation.

The image sensor 13 is supplied with an image signal clock 314 from the image sensor driver 92 for issuing an analog image signal 315 for each pixel. The image signal 315 is then supplied to an image signal processing circuit 316 which corrects the image signal for shading to remove noise from the image signal. The image signal processing circuit 316 also adjusts the level of the image signal 315 since the illumination of the original 312 varies widely for every scanning operation.

The processed image signal 317 from the image signal processing circuit 316 is converted by an A/D converter 318 into a digital signal in synchronism with the image signal clock 314. The digital image signal 319 is then supplied to a switch circuit 321 which issues the image signal 319 in a different direction each time the scanning start signal 313 is applied.

Figure 43:
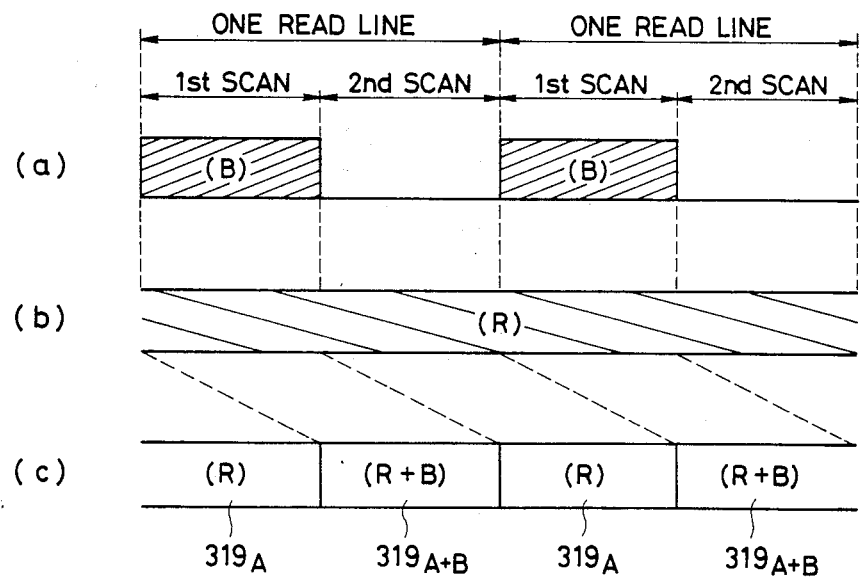
FIGS. 43 through 46 are diagrams of the image reading and color separation in the second modification.

In the modification of FIG. 42, the blue fluorescent lamp 9B is energized in a first scanning operation in one reading line, and de-energized in a second scanning operation in the same reading line, as shown in FIG. 43(a), during which time the red fluorescent lamp 9A is continuously energized as shown in FIG. 43(b). In the first scanning operation, the image signal 319 supplied to the switch circuit 321 is an image signal $319_A$ read by the red fluorescent lamp 9A, and in the second scanning operation, the image signal 319 supplied to the switch circuit 321 is an image signal $319_{A+B}$ read by the red fluorescent lamp 9A and the blue fluorescent lamp 9B (FIG. 43(c)). The switch circuit 321 first issues the image signal $319_{A+B}$ to its first output terminal $O_1$, and then issues the image signal $319_A$ to its second output terminal $O_2$. Thereafter, the image signals $319_{A+B}$, $319_A$ are switched in each scanning operation in the same manner.

The image signal $319_{A+B}$ is supplied to a line memory 322 and delayed thereby for one scanning operation so as to serve as high-order addressing information for a color conversion ROM 323. The image signal $319_A$ is supplied directly to the color conversion ROM 323 as low-order addressing information therefor. The line memory 322 serves to adjust the timing at which the two image signals $319_{A+B}$, $319_A$ are issued as addressing information.

SECOND EMBODIMENT

Figure 47:
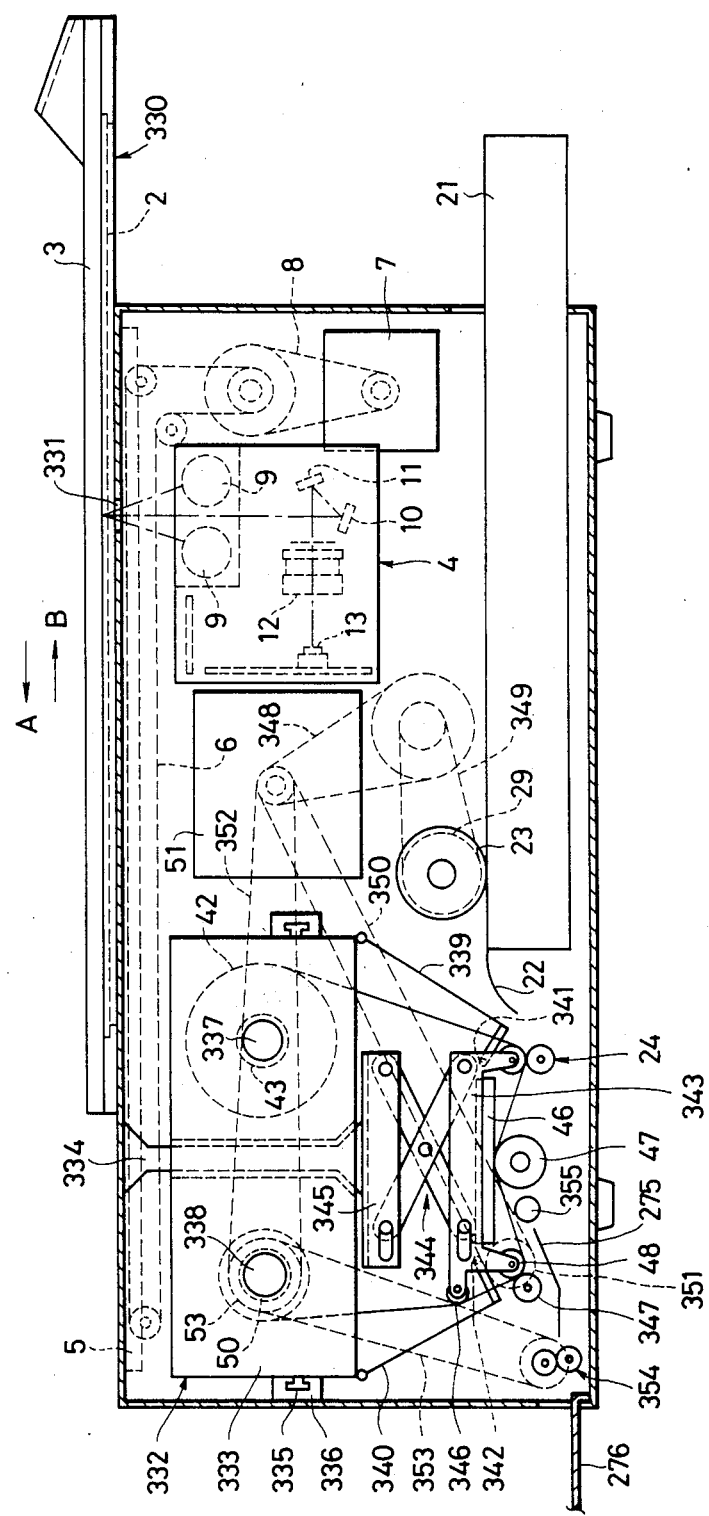
FIG. 47 is a schematic view of a copying machine according to a second embodiment of the present invention.

FIG. 47 schematically shows a copying machine according to a second embodiment of the present invention. Those parts in FIG. 47 which are identical to those in FIG. 1 are denoted by identical reference characters and will not be described in detail.

An original table 330 composed of a platen 2 of glass and a platen cover 3 is guided by guide rails 5 for movement in the directions of the arrows A, B. A scanner unit 4 is fixed in position in a copying machine housing 1. The driving force from a scanner motor 7 is transmitted through belts 8, 6 and rollers to the original table 330. The upper plate of the housing 1 has a slit 331 for reading the image information of an original.

For easy replacement of the ink donor sheet 42, the copying machine has an ink donor cassette 332 composed of a cassette body 333 which is a substantially C-shaped in plan to avoid interference with a support member 334 which supports the thermal head 46 and other members. The cassette body 333 has guided portions 335 on its lateral sides, which are guided by guide rails 336 in the housing 1 for detachment and detachment of the ink donor sheet cassette 332.

The cassette body 333 has supply and takeup shafts 337, 338 on which the supply and takeup rolls 43, 50 are detachably mounted, respectively. When the ink donor cassette 333 is loaded into the housing 1, the takeup shaft 338 is coupled to the slip clutch 53 through a coupling (not shown). The cassette body 333 also has hinged covers 339, 340 supporting supply and takeup guide rollers 341, 342 respectively on the inner surfaces of distal ends thereof.

The thermal head 46 is vertically movable while kept horizontally level. The thermal head 46 is attached to the lower surface of a support plate 343 which is vertically movable and attached to an attachment plate 345 through a link mechanism 344, the support plate 343 being kept horizontal during vertical movement. The attachment plate 345 is fixed to the housing 1. When the support plate 343 is in a lower limit position, the thermal head 46 is pressed against the back roller 47 under the resilient force of a spring (not shown). One of the register rollers 24, the drive roller 48, and a heating roller 346 are mounted on the support plate 343. When the support plate 343 is in the lower limit position, the register roller 24 and the drive roller 48 mounted thereon are held in rolling contact with the other register roller 24 and a pinch roller 347, respectively.

The recording sheet 22 and the ink donor sheet 42 are fed along by the step motor 51. The driving force from the step motor 51 is transmitted through belts 348, 349 and an electromagnetic clutch 29 on the feed foller 23, through a belt 350 and an electromagnetic clutch 351 to the drive roller 48, through a belt 352 and the slip clutch 53 to the takeup roll 50. The force from motor 51 is also transmitted through a belt 353 to a discharge roller 354.

When the ink donor sheet cassette 332 is to be loaded into the copying machine, the support plate 343 together with the thermal head 46 is moved to an upper limit position and locked in this position by a locking mechanism (not shown). In this position, clearances are left between the thermal head 46 and the back roller 47, the register rollers 24, and the drive roller 48 and the pinch roller 347.

Then, the ends of the guided portions of the ink donor sheet cassette 332 are brought into engagement with the guide rails 336, and the ink donor sheet cassette 332 is pushed into the housing 1 and locked against removal by a locking mechanism (not shown). At the time the ink donor cassette 332 is pushed in, the covers 339, 340 are opened, and the ink donor sheet 42 unwound from the supply roll 43 extends over the guide rollers 341, 342 and is wound around the takeup roll 50. Therefore, when the ink donor sheet cassette 332 is pushed in, the ink donor sheet 42 kept taut between the guide rollers 331, 332 can smoothly enter between the back roller 47 and the thermal head 46 without interfering with the latter.

Then, the support plate 343 with the thermal head 46 are lowered to the lower limit position to bring the thermal head 46 into pressing contact with the back roller 47, the drive roller 48 with the pinch roller 347, and the upper register roller 24 with the lower register roller 24. The ink donor sheet 42 is now positioned around the guide roller 341, between the register rollers 24, between the thermal head 46 and the back roller 47, between the drive roller 48 and the pinch roller 347, and around the guide roller 342.

The covers 339, 340 are then closed and locked in the closed position by a locking mechanism (not shown). The ink donor sheet unwound from the supply roll 43 is then positioned between the register rollers 24, between the thermal head 46 and the back roller 47, and between the drive roller 48 and the pinch roller 347, and then is wound around the takeup roll 50. The ink donor sheet cassette 332 is now mounted in position. The ink donor sheet cassette 332 can be unloaded by reversing the above loading process.

The heating roller 346 serves to erase a reverse image formed on the ink donor sheet 42 wound around the takeup roll 50 after the image has been transferred to the recording sheet 22. More specifically, the heating roller 346 is heated under the control of the sequence controller up to a temperature which is 10° to 15° C. higher than the melting point of the ink on the ink donor sheet 42 for fluidizing or subliming the remaining ink on the ink donor sheet 42 to thereby destroy the reverse image. Thus, information can be prevented from leaking out through the used ink donor sheet 42. The heating roller 346 may be replaced with a posistor or the like.

The copying machine has a quartz lamp 355 for heating the recording sheet 22 immediately after it has passed between the thermal head 46 and the back roller 47. The quartz lamp 355 heats the recording sheet 22 under the control of the sequence controller to heat the transferred ink on the recording sheet 22 so that the ink will permeate the recording sheet 22. The transferred ink can thus be fixed more effectively. The quartz lamp 355 may be disposed in front of the back roller 47, or may be replaced with a heat roller. Alternatively, the back roller 47 may double as a heating roller.

Since the scanner unit 4 is fixed in the copying machine, it can be positioned in the same horizontal plane as that in which the ink donor cassette 332 lies. Inasmuch as the recording sheet 22 and the ink donor sheet 42 are fed by the sole step motor 51, the copying machine is reduced in size. The original table 330 may be reciprocally moved by the step motor 51.

THIRD EMBODIMENT

Figure 48:
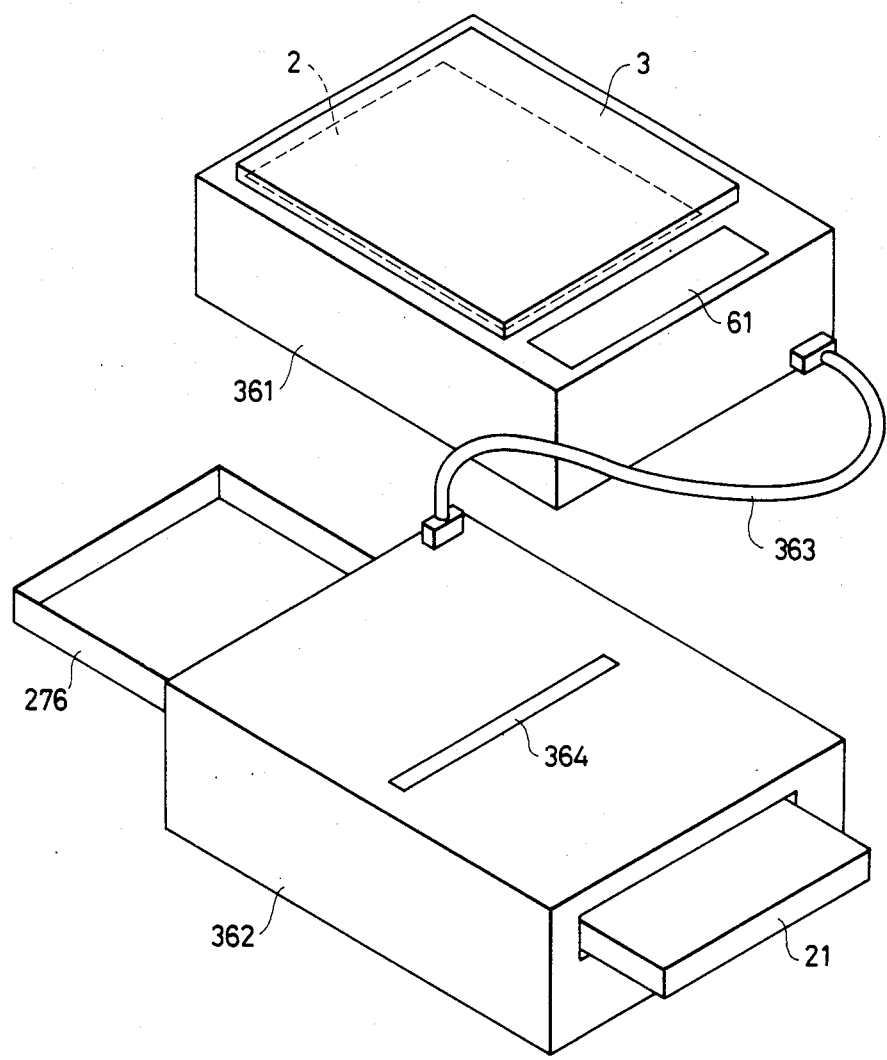
FIG. 48 is a perspective view of a copying machine according to a third embodiment of the present invention.
Figure 49:
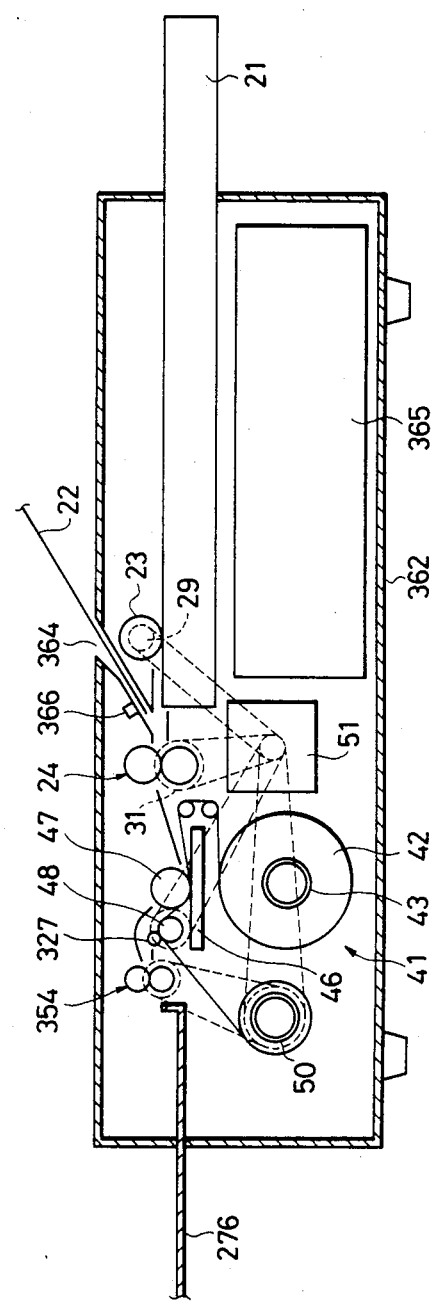
FIG. 49 is a schematic view of a recording assembly of the copying machine of FIG. 48.

FIGS. 48 and 49 schematically illustrate a copying machine according to a third embodiment of the present invention. Those parts in FIGS. 48 and 49 which are identical to those in FIGS. 1 and 47 are denoted by identical reference characters, and will not be described in detail.

In the copying machine of the third embodiment, a reading assembly including a scanner unit and other members, as well as a recording assembly including a thermal head and other members are separated from each other to allow the copying machine to be installed in a limited space available. More specifically, the scanner unit 4 and other members are disposed in a reading assembly housing 361, and the recording assembly 41 and other members are disposed in a recording assembly housing 362, with the housings 361, 362 being interconnected by a cable 363. The recording assembly housing 362 has a manual insertion slot 364 in which a recording paper 22 can manually be inserted. A casing 365 housing a power supply and a control circuit is accommodated in the recording assembly housing 362.

Since a recording sheet 22 can be manually inserted into the recording assembly housing 362, the original can be copied on a recording sheet having a different size than the loaded recording sheets without replacing the sheet cassette 21. When the recording sheet 22 is inserted into the manual insertion slot 364, it is detected by a sensor 366. The sequence controller is responsive to a detected signal from the sensor 366 for starting to energize the step motor 51 and for engaging the electromagnetic clutch 31 for the register rollers 24. The register rollers 24 are rotated to feed the inserted recording sheet 22 toward the thermal head 46 which effects thermal transfer recording thereon. At this time, the electromagnetic clutch 29 for the feed roller is disengaged, and no recording sheet is fed from the sheet cassette 21.

Since the recording assembly housing 362 and the reading assembly housing 361 are separate from each other, only the recording assembly can be used as a printer. The copying machine can thus be used in various modes to meet desired applications.

With the present invention, as described above, the thermal transfer recording system is employed for recording image information on plain paper with small power consumption. The copying machine is also relatively free from adverse influences induced by heat and static electricity, and is small, inexpensive to manufacture, and highly resistant to other environmental effects. The reading assembly and the recording assembly may be used individually to meet a wider range of applications.

Although certain preferred embodiments have been shown and described, it should be understood that many changes and modifications may be made without departing from the scope of the appended claims.

What is claimed is:

1. A copying machine capable of producing a copy from an original to be copied comprising:
    (a) platen means for supporting the original to be copied;
    (b) scanner unit means reciprocally movable relative to said platen means in an auxiliary scanning direction for reading a series of lines on the original and for generating an image signal for each said line;
    (c) thermal head means having a heating region with heating body units for selectively generating thermal pulses in response to the image signals from said scanner unit means;
    (d) means for supplying said thermal head means with an ink donor sheet coated with thermally transferable ink, said ink becoming fluidized or sublimated when heated;
    (e) means for supplying a recording sheet in the vicinity of said thermal head means;
    (f) means for bringing the recording sheet into intimate contact with said heating region of said thermal head means and for interposing the ink donor sheet between the recording sheet and the heating region to record an image on the recording sheet.
    (g) means for separating the ink donor sheet from the recording sheet and for discharging the recording sheet after the image has been recorded on the recording sheet;
    (h) buffer means for temporarily storing the image signal from said scanner unit means; and
    (i) means responsive to the number of image signals stored in said buffer memory means, for controlling the speed of movement of said scanner unit relative to said platen in the auxiliary scanning direction when the original is read.

2. A copying machine according to claim 1, further including a halftone image generating circuit means for generating values for a plurality of pixels, each pixel comprising a matrix of dot data representing the degree of darkness of the corresponding image in a segment of the line which is read, and wherein the degree of darkness of a segment to be printed is expressed by varying the number and size of dots in each pixel.

3. A copying machine according to claim 2 further including means for monitoring the thermal storage effects of the heating body units surrounding each heating body unit and for computing the proper number and degree of darkness of dots to be currently printed.

4. A copying machine according to claim 1, further including a copying machine housing, an ink donor sheet cassette, the cassette having a supply roll for supplying the ink donor sheet and a takeup roll for winding the ink donor sheet, and means for attaching and detaching said ink donor sheet cassette to and from said housing.

5. A copying machine according to claim 1, wherein said means for supplying the recording sheet comprises a sheet cassette, means for feeding the recording sheet from said sheet cassette.

6. A copying machine according to claim 1, including:
    a reading assembly housing means for housing the platen and scanner unit; and
    recording assembly housing means for housing the thermal head means, the ink donor sheet supplying means, the recording sheet supplying means, and the separating and discharging means;
    wherein the reading assembly housing means and the recording assembly housing means are separate housings which are physically separable but electrically interconnected during operation.

* * * * *